United States Patent
Kasuya et al.

(10) Patent No.: US 12,011,884 B2
(45) Date of Patent: Jun. 18, 2024

(54) FIBER-REINFORCED RESIN MOLDED BODY AND METHOD FOR PRODUCING CARBON FIBER SHEET USED THEREFOR

(71) Applicant: KURASHIKI BOSEKI KABUSHIKI KAISHA, Kurashiki (JP)

(72) Inventors: Akira Kasuya, Osaka (JP); Naoki Kakimi, Osaka (JP)

(73) Assignee: Kurashiki Boseki Kabushiki Kaisha, Okayama (JP)

( * ) Notice: Subject to any disclaimer, the term of this patent is extended or adjusted under 35 U.S.C. 154(b) by 0 days.

(21) Appl. No.: 17/430,164

(22) PCT Filed: Feb. 10, 2020

(86) PCT No.: PCT/JP2020/005136
§ 371 (c)(1),
(2) Date: Aug. 11, 2021

(87) PCT Pub. No.: WO2020/166558
PCT Pub. Date: Aug. 20, 2020

(65) Prior Publication Data
US 2022/0152975 A1    May 19, 2022

(30) Foreign Application Priority Data
Feb. 14, 2019    (JP) .................. 2019-024465

(51) Int. Cl.
*B32B 5/12* (2006.01)
*B29C 70/18* (2006.01)
(Continued)

(52) U.S. Cl.
CPC .............. *B29C 70/18* (2013.01); *B29C 70/20* (2013.01); *B29C 70/30* (2013.01); *B32B 5/12* (2013.01);
(Continued)

(58) Field of Classification Search
None
See application file for complete search history.

(56) References Cited

U.S. PATENT DOCUMENTS

| 6,094,791 A | 8/2000 | Akase et al. |
| 2013/0005205 A1 | 1/2013 | Fisset et al. |

(Continued)

FOREIGN PATENT DOCUMENTS

| CN | 102802944 | 11/2012 |
| CN | 102947076 | 2/2013 |

(Continued)

OTHER PUBLICATIONS

International Search Report issued in International Application No. PCT/JP2019/047788, dated Mar. 10, 2020, 5 pages w/ translation.

(Continued)

*Primary Examiner* — Alexander S Thomas
(74) *Attorney, Agent, or Firm* — HSML P.C.

(57) ABSTRACT

A fiber reinforced resin molded body; including: resin-integrated carbon fiber sheets 20 that are stacked and unified, each of the resin-integrated carbon fiber sheets 20 including a carbon fiber sheet 21 and at least one resin 23 selected from the group consisting of thermoplastic resin and thermosetting resin. The carbon fiber sheet 21 includes a unidirectional long-fiber group 21a spread and arrayed in one direction, and multidirectional fibers 22a and 22b derived from the unidirectional long-fiber group. The multidirectional fibers 22a and 22b cross carbon fibers constituting the unidirectional long-fiber group. The fiber reinforced resin molded body is a molded body of two or more stacked layers of the resin-integrated carbon fiber sheets 20, or a molded body of the resin-integrated carbon fiber sheet 20 that is stacked with a resin-integrated carbon fiber sheet including a different carbon fiber sheet. Thus, the present invention provides a fiber reinforced resin molded body including a (Continued)

surface-modified carbon fiber sheet and thus having high interlaminar fracture toughness, and a method for producing the carbon fiber sheet for the fiber reinforced resin molded body.

10 Claims, 17 Drawing Sheets

(51) Int. Cl.
    *B29C 70/20*      (2006.01)
    *B29C 70/30*      (2006.01)
    *B32B 5/26*      (2006.01)
    *B29K 101/12*      (2006.01)
    *B29K 307/04*      (2006.01)

(52) U.S. Cl.
    CPC ............ *B32B 5/26* (2013.01); *B29K 2101/12* (2013.01); *B29K 2307/04* (2013.01); *B32B 2262/106* (2013.01)

(56) References Cited

U.S. PATENT DOCUMENTS

| | | | |
|---|---|---|---|
| 2013/0136890 A1 | 5/2013 | Maliszewski et al. | |
| 2014/0217332 A1* | 8/2014 | Simmons | B32B 17/04 264/105 |
| 2014/0322504 A1 | 10/2014 | Narimatsu et al. | |
| 2014/0370237 A1 | 12/2014 | Ponsolle et al. | |
| 2015/0376353 A1 | 12/2015 | Takebe et al. | |
| 2016/0369071 A1 | 12/2016 | Ohtani et al. | |
| 2017/0130017 A1 | 5/2017 | Okamoto et al. | |
| 2017/0241074 A1 | 8/2017 | Ono et al. | |
| 2018/0079879 A1 | 3/2018 | Otsuki et al. | |
| 2018/0215110 A1 | 8/2018 | Kawabe et al. | |
| 2018/0311912 A1 | 11/2018 | Restuccia et al. | |
| 2018/0313027 A1 | 11/2018 | Horimoto et al. | |
| 2019/0160762 A1 | 5/2019 | Ono et al. | |
| 2021/0129488 A1 | 5/2021 | Takahashi et al. | |

FOREIGN PATENT DOCUMENTS

| | | |
|---|---|---|
| CN | 104781317 | 7/2015 |
| CN | 107735433 | 2/2018 |
| CN | 108638601 | 10/2018 |
| CN | 109233201 | 1/2019 |
| EP | 3 162 842 | 5/2017 |
| EP | 3 904 032 | 11/2021 |
| JP | 56-43435 | 4/1981 |
| JP | 10-292238 | 11/1998 |
| JP | 2001-288639 | 10/2001 |
| JP | 2003-165851 | 6/2003 |
| JP | 2004-100132 | 4/2004 |
| JP | 2005-163223 | 6/2005 |
| JP | 2011-148146 | 8/2011 |
| JP | 2012-106461 | 6/2012 |
| JP | 2012-111957 | 6/2012 |
| JP | 2013-522412 | 6/2013 |
| JP | 2013-159723 | 8/2013 |
| JP | 2015-221867 | 12/2015 |
| JP | 5999721 | 9/2016 |
| JP | 6148281 | 6/2017 |
| JP | 2017-132932 | 8/2017 |
| JP | 2017-190439 | 10/2017 |
| TW | 201542642 | 11/2015 |
| TW | 201736096 | 10/2017 |
| WO | 2013/099741 | 7/2013 |
| WO | 2016/152856 | 9/2016 |
| WO | 2018/038033 | 3/2018 |
| WO | 2018/124215 | 7/2018 |

OTHER PUBLICATIONS

Extended European Search Report issued in European Patent Application No. 19905301.8, dated Aug. 26, 2022, 7 pages.
Extended European Search Report issued in European Patent Application No. 20756067.3, dated Oct. 4, 2022, 8 pages.
Office Action issued in corresponding Japanese Patent Application No. 2020-563019, dated Nov. 1, 2022, 10 pages w/translation.
International Search Report issued in International Application No. PCT/JP2020/005136, dated Apr. 21, 2020, 4 pages.
Nara, et al., "Synthetic Fiber Filament Processing Manual", vol. 2, Textile Industry Press, (1982), pp. 78-78—with English translation.
Office Action issued in Japanese Office Action issued in corresponding Japanese Patent Application No. 2020-572245, dated Nov. 28, 2023, 10 pages w/translation.
English translation of the Decision of Rejection issued in corresponding Chinese Patent Application No. 202080014322.5, Mar. 20, 2024, 11 pages.

* cited by examiner

FIBER-REINFORCED RESIN MOLDED BODY AND METHOD FOR PRODUCING CARBON FIBER SHEET USED THEREFOR

TECHNICAL FIELD

The present invention relates to a fiber reinforced resin molded body and a method for producing a carbon fiber sheet for the fiber reinforced resin molded body.

BACKGROUND ART

Fiber reinforced composites made from various fibers and matrix resins are excellent in mechanical properties and widely used in general industrial applications including building members, laptop housings, IC trays, sports goods, windmills, automobiles, railroad vehicles, ships, aircraft, and spacecraft. In particular, fiber reinforced composites prepared by impregnating easy-to-process reinforcing fiber material sheets with resin are used in a broad range of applications as materials combining lightness, strength, and rigidity. Among them, continuous fiber sheets having extremely high tensile strength as compared with discontinuous fiber sheets are drawing attention as materials for members to be strong such as structural members and outer panels of aircraft, spacecraft, ships, automobiles, and buildings.

To produce such fiber reinforced composites, various methods are adoptable depending on the type and required physical properties of products. Specifically, the fiber reinforced composites can be produced by stacking a plurality of sheet-shaped intermediate materials (prepregs, semipregs) including resin and a carbon fiber material and molding the stack by applying heat and pressure.

In the fiber reinforced composites, a plurality of sheets, each including carbon fibers arranged in one direction as a reinforcing fiber material, can be stacked in one direction, an orthogonal direction or a different direction relative to the fiber axis direction to control physical properties of respective directions.

The strength and the elastic modulus of the fiber reinforced composites are extremely high against a stress applied along the fiber axis direction of the reinforcing fibers but low against a stress applied perpendicular to the fiber axis direction (i.e., the thickness direction). Particularly, it is known that fiber reinforced composites prepared by stacking fiber sheets suffer interlaminar fracture due to a stress concentrated between layers even when the strength in the fiber direction is increased, and strengthening only the fiber direction does not fundamentally solve the interlaminar fracture.

To cope with this, a method of arranging adhesive thermoplastic resin between stacked sheets has been studied conventionally. However, the method of arranging adhesive resin restricts the choice of resin in terms of affinity with the matrix resin, glass transition point, flow starting temperature, melting point and the like, and better solutions have been demanded.

Patent Documents 1 and 2 propose enhancing interlaminar fracture toughness by arranging short-fiber webs between prepregs.

The interlaminar fracture toughness is a resistance against the growth of interlaminar delamination crack of fiber sheets that are stacked in layers and constitute a fiber reinforced composite, and represents a. Mode I (opening) interlaminar fracture toughness (GIc) and a Mode II (shear) interlaminar fracture toughness (GIIc) in the crack growth process.

PRIOR ART DOCUMENTS

Patent Documents

Patent Document 1: JP 2017-132932 A
Patent Document 2: WO 2013-099741

DISCLOSURE OF INVENTION

Problem to be Solved by the Invention

In the conventional technique, the short-fiber webs have poor adhesion to carbon fiber sheets as the base material and cause discontinuity when they are formed into a stack. This results in delamination between the base material and the short-fiber webs.

To solve the above problems, the present invention provides a fiber reinforced resin molded body including a surface-modified carbon fiber sheet and thus having high interlaminar fracture toughness, and a method for producing the carbon fiber sheet for the fiber reinforced resin molded body.

Means for Solving Problem

A fiber reinforced resin molded body of the present invention is a fiber reinforced resin molded body, including: resin-integrated carbon fiber sheets that are stacked and unified, each of the resin-integrated carbon fiber sheets including a carbon fiber sheet and at least one resin selected from the group consisting of thermoplastic resin and thermosetting resin. The carbon fiber sheet includes a unidirectional long-fiber group spread and arrayed in one direction, and multidirectional fibers derived from the unidirectional long-fiber group. The multidirectional fibers cross carbon fibers constituting the unidirectional long-fiber group. The fiber reinforced resin molded body is a molded body of two or more stacked layers of the resin-integrated carbon fiber sheets, or a molded body of the resin-integrated carbon fiber sheet that is stacked with a resin-integrated carbon fiber sheet including a different carbon fiber sheet.

A method for producing a carbon fiber sheet of the present invention is a method for producing a carbon fiber sheet for the above fiber reinforced resin molded body including: spreading a carbon fiber filament group by passage through a plurality of rollers or spreading bars while tensioning the carbon fiber filament group to generate multidirectional fibers from the carbon fiber filament group so that the multidirectional fibers cross carbon fibers constituting a unidirectional long-fiber group of the carbon fiber sheet.

Effects of the Invention

The fiber reinforced resin molded body of the present invention has high interlaminar fracture toughness. This is because the multidirectional fibers generated from the unidirectional long-fiber group are tangled with resin, which produces a physical anchoring effect. In addition, when the multidirectional fibers are generated from the unidirectional long-fiber group, the multidirectional fibers cross the carbon fibers constituting the unidirectional long-fiber group, and at the same time, cut faces, breakages, scratches and the like that are left on the carbon fibers enhance adhesion between the carbon fibers and the resin, which improves the strength and the elastic modulus of the resin present between layers. A synergistic effect obtained by the above combination improves the interlaminar fracture toughness. In other words, the multidirectional fibers generated from the carbon fiber sheet as well as the cut faces, breakages, scratches and the like that are left on the carbon fibers during the generation of the multidirectional fibers modify the surface of the carbon fiber sheet. Thereby, it is possible to provide a fiber reinforced resin molded body having high interlaminar fracture toughness, and a method for producing a carbon fiber sheet for the fiber reinforced resin molded body.

DESCRIPTION OF THE INVENTION

Figure 1:
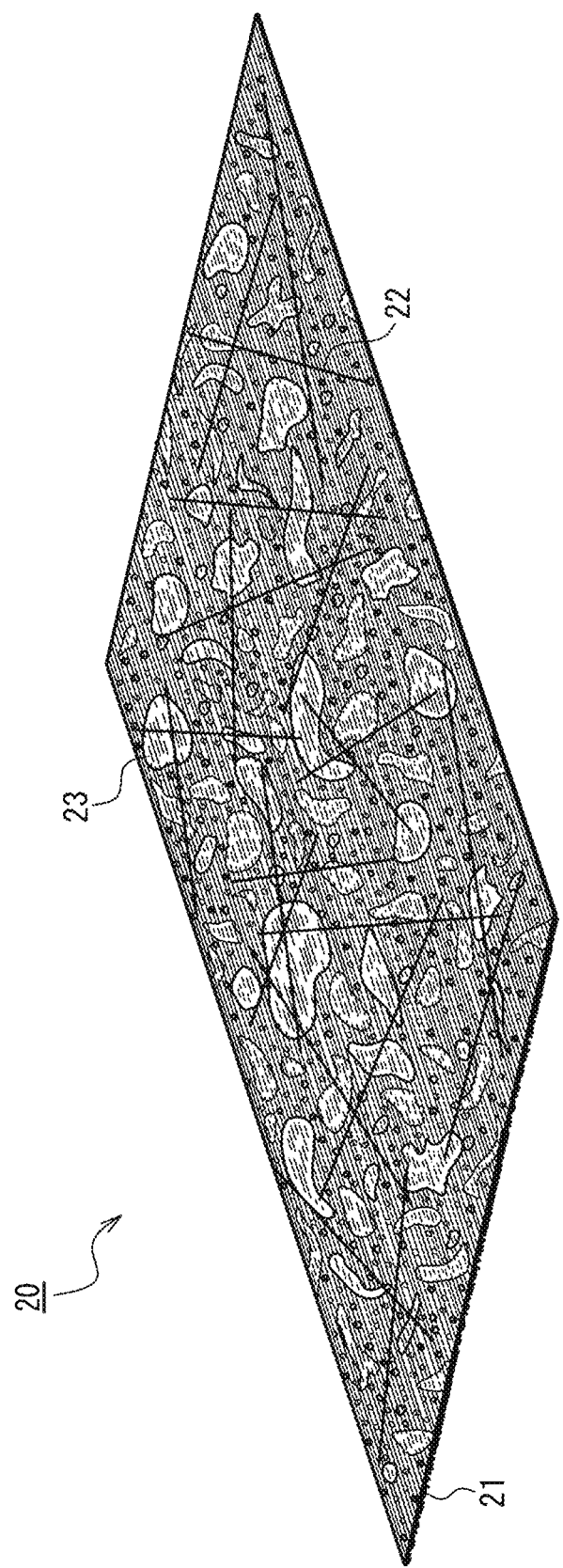
FIG. 1 is a schematic perspective view of a resin-integrated carbon fiber sheet according to an embodiment of the present invention.

The fiber reinforced resin molded body of the present invention is a fiber reinforced resin molded body including: resin-integrated carbon fiber sheets that are stacked and unified, each of the resin-integrated carbon fiber sheets including a carbon fiber sheet and at least one resin selected from the group consisting of thermoplastic resin and thermosetting resin. The carbon fiber sheet includes a unidirectional long-fiber group spread and arrayed in one direction, and multidirectional fibers derived from the unidirectional long-fiber group. The multidirectional fibers are generated from the unidirectional long-fiber group and oriented in any direction different from the direction of the unidirectional fiber group. The multidirectional fibers cross the carbon fibers constituting the unidirectional long-fiber group. Here, crossing includes tangling. For example, the multidirectional fibers are partially or entirely present inside the unidirectional long fibers and cross the unidirectional long fibers stereoscopically.

The fiber reinforced resin molded body of the present invention is a molded body of two or more stacked layers of the resin-integrated carbon fiber sheets, or a molded body of the resin-integrated carbon fiber sheet that is stacked with a resin-integrated carbon fiber sheet including a different carbon fiber sheet. The resin of the fiber reinforced resin molded body of the present invention is at least one selected from the group consisting of thermoplastic resin and thermosetting resin. Thus, a wide variety of resins from general-purpose resins to special resins can be used.

It is preferred that the multidirectional fibers are fibers separated from the unidirectional long-fiber group and/or bent fibers of the fibers constituting the unidirectional long-fiber group. The multidirectional fibers oriented in many directions have high adhesion to resin and produce a high anchoring effect with resin, thereby improving the interlaminar fracture toughness of the fiber reinforced resin molded body.

It is preferred that the resin of the resin-integrated carbon fiber sheet is present on the surface of the carbon fiber sheet and impregnated in the carbon fiber sheet through a molding process of a fiber reinforced resin molded body Such a structure can be obtained by applying a thermoplastic resin in the form of a film, non-woven fabric, powder, etc., to a spread carbon fiber sheet, followed by heat melting.

The resin of the resin-integrated carbon fiber sheet may be impregnated in the carbon fiber sheet. Prepregs can be produced by impregnation of resin. The impregnation of resin can be performed by dissolving or dispersing resin in an aqueous system, a solvent system or a mixed system of these, applying it to the carbon fiber sheet by immersion, coating or the like, and drying it.

The carbon fiber sheet contains the multidirectional fibers in an amount of preferably 1 to 25% by mass, more preferably 3 to 20% by mass, and further preferably 5 to 15% by mass with respect to 100% by mass of the carbon fiber sheet. The multidirectional fibers present in the above proportion produce the synergistic effect, which is a combination of the physical anchoring effect that is achieved by the multidirectional fibers tangled with the matrix resin and the enhanced adhesion between the carbon fibers and the matrix resin that is achieved by the cut faces, breakages, scratches and the like that are left on the carbon fibers. Moreover, the carbon fiber sheet can be strong in the width direction, high in cleavage resistance, and excellent in handleability.

It is preferred that the carbon fiber sheet has a tensile strength in a longitudinal direction of 80% or more of a tensile strength of a carbon fiber bundle before spreading. Although the tensile strength of the carbon fiber sheet tends to decrease because of the generation of the multidirectional fibers, this does not cause a big problem as long as the tensile strength is adjusted to 80% or more of the tensile strength of the carbon fiber bundle before spreading. Specifically, the degraded tensile strength can be compensated by increasing the number of sheets to be stacked.

The fiber reinforced resin molded body contains the carbon fibers in a volume ratio (Vf) of preferably 30 to 70%, more preferably 40 to 65%, and further preferably 45 to 60% based on 100% of the fiber reinforced resin molded body. Within the above ratio, the resin-integrated carbon fiber sheet is suitable as a carbon fiber reinforced resin intermediate for a fiber reinforced resin molded product, which is formed by applying heat and pressure on a plurality of stacked resin-integrated carbon fiber sheets.

The method for producing the carbon fiber sheet of the present invention includes: spreading a carbon fiber filament group by passage through a plurality of rollers or spreading bars while tensioning the carbon fiber filament group to generate multidirectional fibers (hereinafter, also referred to as "bridging fibers") from the carbon fiber filament group so that the multidirectional fibers cross carbon fibers constituting the unidirectional long-fiber group of the carbon fiber sheet. For example, the tension of the carbon fiber filament group in the spreading process is set at 2.5 N or more to generate bridging fibers from the carbon fiber filament group. A preferable tension is 5.0 N or more. The tension of the carbon fiber filament group (tow) is the tension per, e.g., 15,000 filaments when the carbon fiber filament group is supplied from one feed bobbin to the spreading process. With this tension, bridging fibers are generated easily.

The rollers or the spreading bars may vibrate in the width direction during spreading of the carbon fiber filament groups. Thus, the carbon fiber filament groups can be spread efficiently and bridging fibers are generated easily.

The carbon fiber filament groups, each being wound on a bobbin, are fed, and opened and spread in the width direction to form a single spread fiber sheet. Thereby, a thin wide spread fiber sheet can be obtained.

The carbon fiber sheet of the present invention is a carbon fiber sheet, including a unidirectional long-fiber group that is a carbon fiber filament group spread and arrayed in parallel in one direction, and multidirectional fibers derived from the unidirectional long-fiber group. The carbon fiber filament group refers to a bundle of a large number of carbon fiber filaments (hereinafter, also referred to as a "carbon fiber tow before spreading"). The term "spreading" means that a large number of carbon fibers in a tow are spread apart in the width direction and formed into a thin sheet shape or a tape shape. The thickness is preferably 0.02 to 0.4 mm, and more preferably 0.02 to 0.3 mm. The carbon fiber tow before spreading used in the present invention is preferably 3 to 60K, and more preferably 12 to 60K. The K value indicates 1000 filaments. A commercially available large tow (e.g., 50K for 50000 filaments) generally has a width of about 12 mm.

One or more of the multidirectional fibers (bridging fibers) is present on average on the surface of the carbon fiber sheet per 10 mm$^2$ of the carbon fiber sheet in a direction different from the arrayed direction (fiber direction) of the carbon fibers constituting the unidirectional long-fiber group of the carbon fiber sheet. The number of the bridging fibers is preferably 25 to 150, and more preferably 30 to 135 on average per 10 mm$^2$ of the carbon fiber sheet. The angle of the bridging fibers is not particularly limited as long as it is a direction different from the arrayed direction of the carbon fibers constituting the unidirectional long-fiber group and above 0 degree and below 180 degrees relative to the arrayed direction of the carbon fibers constituting the unidirectional long-fiber group. Although the most efficient angle of the bridging fibers is 90 degrees, the angle of the bridging fibers is difficult to control and hence it may be any direction.

The resin is present on part of the surface of the carbon fiber sheet and adhesively fixes the bridging fibers to the carbon fiber sheet. This makes the carbon fiber sheet excellent in handleability.

The bridging fibers are carbon fibers derived from the carbon fiber filament group. The bridging fibers function as described above.

The bridging fibers may be present either on one surface or both surfaces of the carbon fiber sheet. It is preferred that the bridging fibers are present on both surfaces of the carbon fiber sheet. It is preferred that the bridging fibers are also present inside the carbon fiber sheet in directions crossing the carbon fibers constituting the unidirectional long-fiber group of the carbon fiber sheet. For example, the bridging fibers may be partially present on the surface of the carbon fiber sheet and partially present inside the carbon fiber sheet.

The matrix resin is preferably at least one selected from the group consisting of thermoplastic resin and thermosetting resin. Examples of the thermoplastic resin include, but are not particularly limited to, polyolefin resin such as polyethylene or polypropylene, nylon (polyimide) resin, polyimide resin, polyester resin, polycarbonate resin, polyether ether ketone resin, polyether ketone ketone resin, and phenoxy resin. Examples of the thermosetting resin include, but are not particularly limited to, epoxy resin, unsaturated polyester resin, phenol resin, and melamine resin. Of these, thermoplastic resin is preferred.

A preferable adhesion state of the resin of the resin-integrated carbon fiber sheet of the present invention is such that melt-solidified resin adheres to the surface of the spread carbon fiber sheet, and the resin is not impregnated inside the carbon fiber sheet or is only partially impregnated in the carbon fiber sheet. The resin-integrated carbon fiber sheet with the above adhesion state of the resin can be suitably formed into a fiber reinforced resin molded product by applying heat and pressure on a plurality of stacked resin-integrated carbon fiber sheets.

The mass of the resin-integrated carbon fiber sheet is preferably 10 to 3000 g/m$^2$, more preferably 20 to 2000 g/m², and further preferably 30 to 1000 g/m². The sheet in the above range is practical and can be suitably used in various applications.

The resin on the surface of the resin-integrated carbon fiber sheet is preferably a resin that becomes a matrix resin through formation of the fiber reinforced resin molded body from the carbon fiber sheet. With this configuration, the resin-integrated carbon fiber sheet can be formed into a fiber reinforced resin molded product by applying heat and pressure on a plurality of stacked resin-integrated carbon fiber sheets.

The spread carbon fiber sheet (hereinafter, also referred to as a "spread fiber sheet") is spread preferably by 3 to 400%, more preferably 5 to 330% relative to the width of the carbon fiber bundle (tow). In the method of the present invention, carbon fiber bundles (tows) available from carbon fiber manufacturers can be opened and formed into easy-to-use spread fiber sheets, which can be used in various molded products. It is preferred that the carbon fiber bundle (tow) includes 3,000 to 50,000 fibers per bundle, and the number of the carbon fiber bundles (tows) to be fed is 10 to 280.

The average length of the bridging fibers (multidirectional fibers) is preferably 1 mm or more, and more preferably 5 mm or more. Within the above range of the average length of the bridging fibers, the carbon fiber sheet can be strong in the width direction and excellent in handleability.

The production method of the resin-integrated carbon fiber sheet of the present invention includes the following processes.

A: Spreading a carbon fiber filament group by at least one selected from the group consisting of passage through a plurality of rollers, passage through a plurality of a spreading bar, and air spreading, and arraying the spread carbon fiber filament group in parallel in one direction; and generating bridging fibers from the carbon fiber filament group during or after spreading of the carbon fiber filament group. In the case of generating bridging fibers after spreading, the bridging fibers are generated by the bridge rollers.

B: Applying resin powder to the carbon fiber sheet, heat-melting the resin powder in a pressure-free state and cooling it to form a semipreg, or bringing the carbon fiber sheet into contact with a resin liquid to form a prepreg. The following exemplifies a semipreg.

An exemplary method for producing a semipreg will be described specifically with reference to drawings. In the drawings, the same reference numerals are assigned to the same components.

<Air Spreading Process+Bridging Fiber Generating Process+Resin Powder Applying Process>

Figure 3:
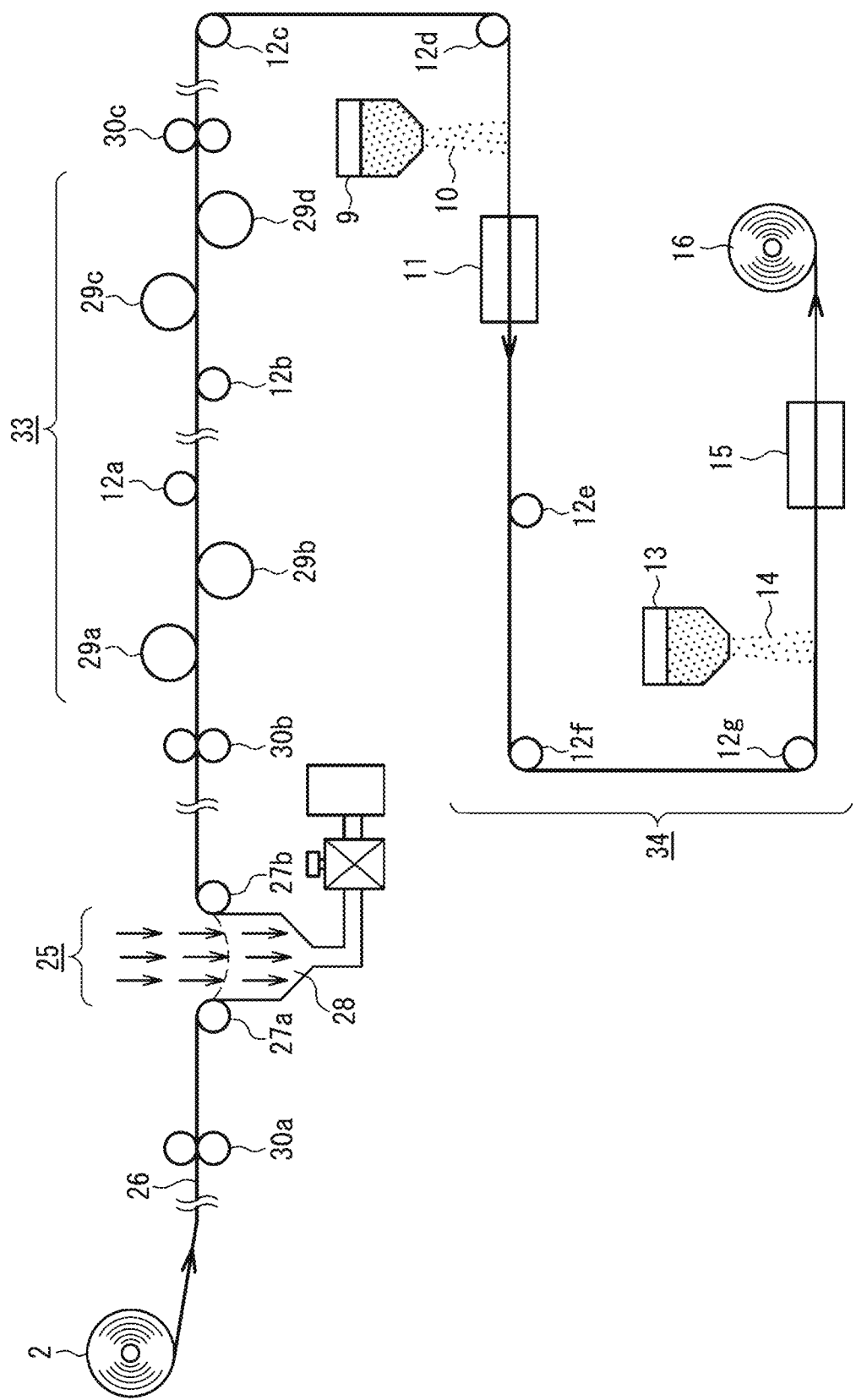
FIG. 3 is a schematic process diagram illustrating a production method of a resin-integrated carbon fiber sheet according to an embodiment of the present invention.

As illustrated in FIG. 3, carbon fiber filament groups 26 are nipped between a plurality of nip rollers 30a and 30b, between which a deflection space 28 is provided between holding rollers 27a and 27b. The carbon fiber filament groups 26 are conveyed while air inside the deflection space 28 is being withdrawn. Thus, the carbon fiber filament groups 26 are spread (air spreading process 25). The number of the deflection space 28 may be one or two or more. The carbon fiber filament groups 26 are constituted by tows gathered from a plurality of feed bobbins 2.

After the spreading process, the spread tows are nipped between the nip rollers 30b and 30c and conveyed between a plurality of bridge rollers 29a to 29d disposed therebetween while being tensioned at, e.g., 2.5 to 30 N per 15,000 filaments (corresponding to a carbon fiber filament group fed from one feed bobbin) to generate bridging fibers (bridging fiber generating process 33). The bridge rollers may rotate or vibrate in the width direction. The bridge rollers may have, e.g., a pearskin finish surface, an uneven surface or a mirror surface, and generate bridging fibers through bending, fixation, rotation, vibration, or a combination of these, of the carbon fiber filament groups. Reference numerals 12a to 12g denote guide rollers.

Then, dry resin powder 10 is sprinkled on the front surface of the spread fiber sheet from a powder feed hopper 9, and the sheet is fed into a heater 11 in a pressure-free state to heat and melt the dry resin powder 10, and cooled between the guide rollers 12e to 12g. Thereafter, dry resin powder 14 is sprinkled on the back surface of the spread fiber sheet from a powder feed hopper 13, and the sheet is fed into a heater 15 in a pressure-free state to heat and melt the dry resin powder 14, and cooled and taken up on a take-up roller 16 (resin powder applying process 34). The dry resin powders 10 and 14 are, e.g., phenoxy resin (flow starting temperature: 180° C.), the temperatures inside the heaters 11 and 15 are at or above the melting point or flow starting temperature of the resin, and the residence times therein are 4 seconds each. Thus, the spread fiber sheet can be strong in the width direction and handled as a sheet without separation of the constituent carbon fibers.

<Roller Spreading Process (+Bridging Fiber Generating Process)+Resin Powder Applying Process>

Figure 4:
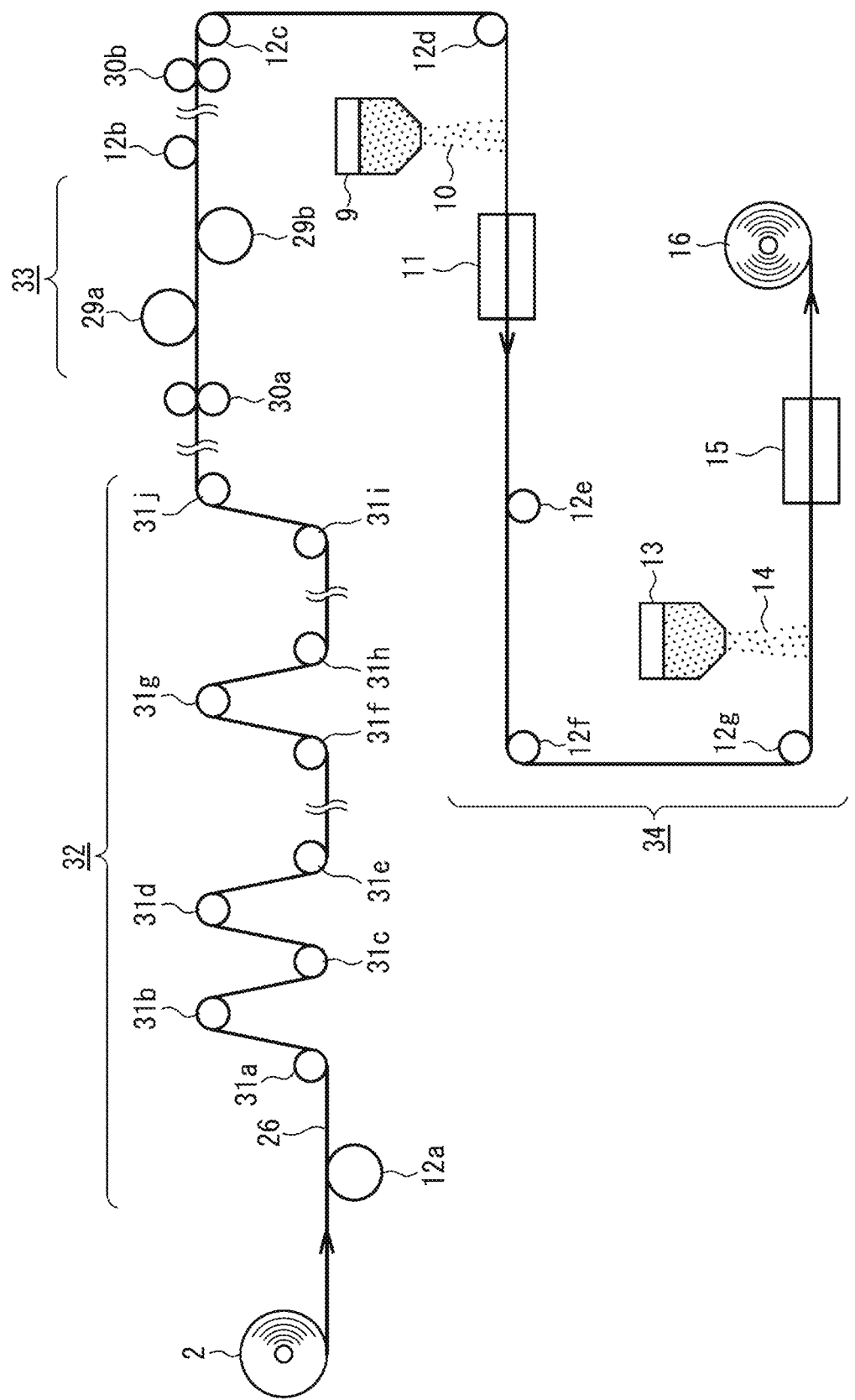
FIG. 4 is a schematic process diagram illustrating a production method of a resin-integrated carbon fiber sheet according to another embodiment of the present invention.

As illustrated in FIG. 4, the carbon fiber filament groups 26 are conveyed between spreading rollers 31a to 31j to generate bridging fibers during spreading (roller spreading process 32). The spreading rollers may be fixed, rotate, or vibrate in the width direction. If the amount of the generated bridging fibers is small, bridging fibers are generated by nipping the spread tows between the nip rollers 30a and 30b and conveying them between a plurality of bridge rollers 29a and 29b disposed therebetween while tensioning the tows at, e.g., 2.5 to 30 N per 15,000 filaments (bridging fiber generating process 33). The bridging fiber generating process 33 is unnecessary if the roller spreading process 32 can yield a sufficient amount of the bridging fibers. Then, the carbon fiber filament groups 26 undergo the resin powder applying process 34 in the same manner as in the process illustrated in FIG. 3.

<Bridge Rollers>

Figure 5A:
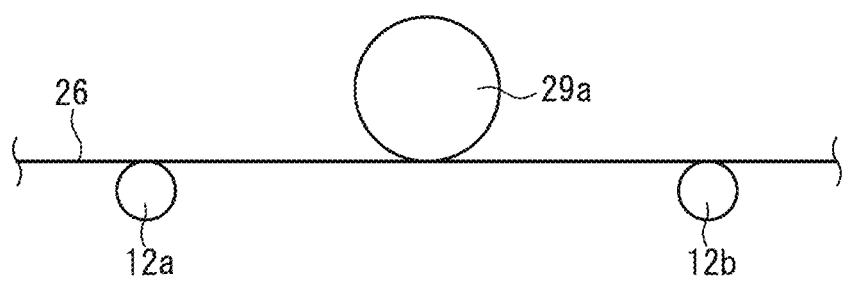
FIGS. 5A to 5E are schematic explanatory views each illustrating a spreading device according to an embodiment of the present invention.
Figure 5B:
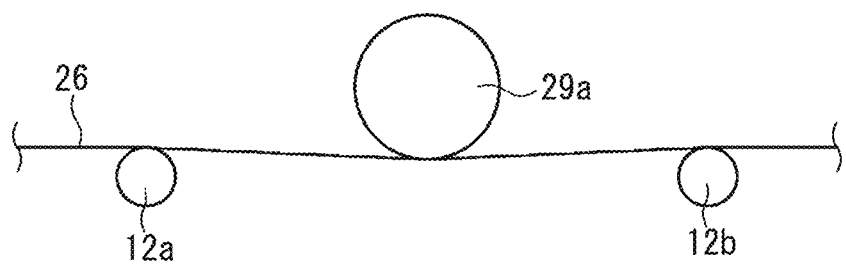
Figure 5C:
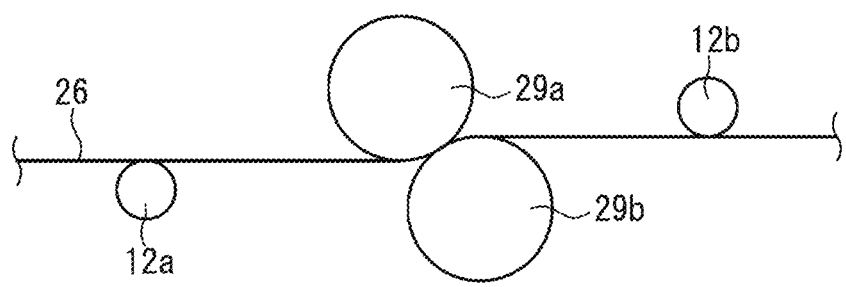
Figure 5D:
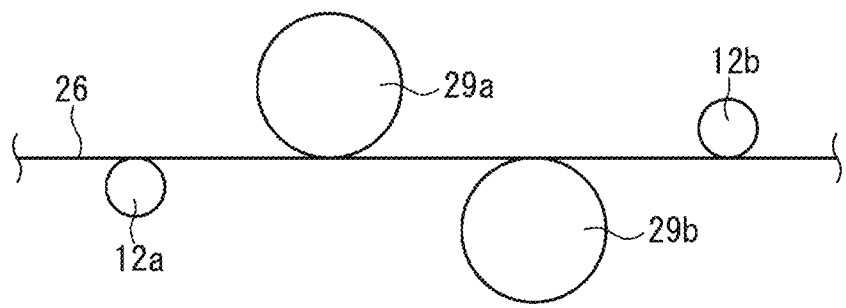
Figure 5E:
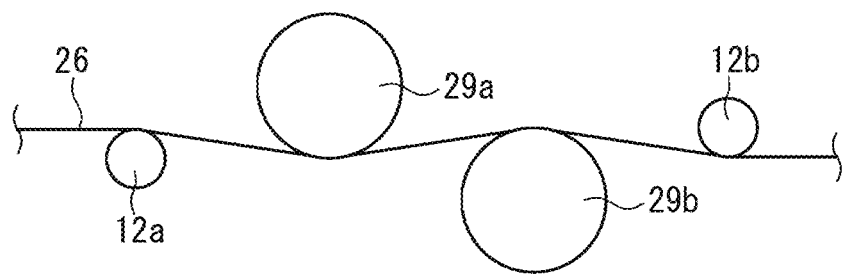
Figure 6:
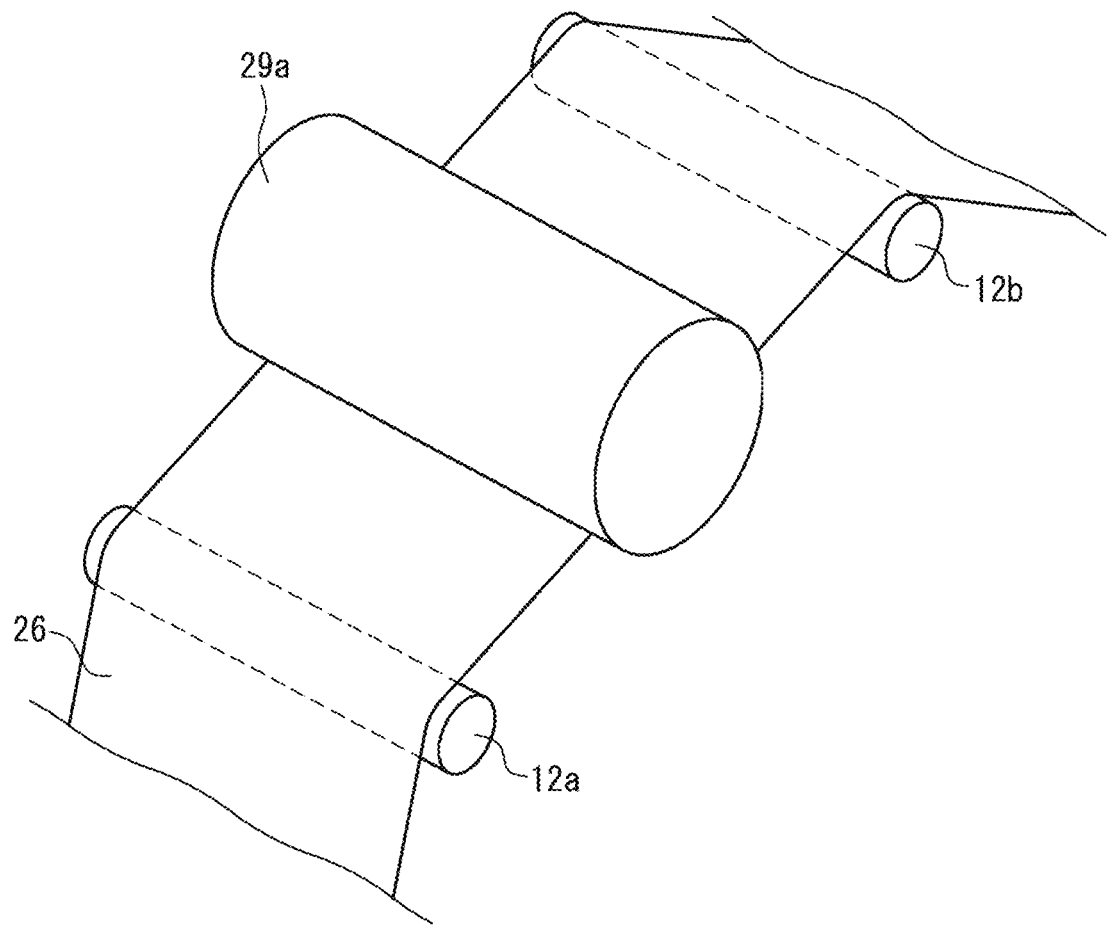
FIG. 6 is a partially enlarged perspective view of FIG. 5B.

In addition to the bridge rollers illustrated in FIGS. 3 and 4, bridge rollers illustrated in FIGS. 5A to 5E can also be used. FIG. 5A illustrates an example in which the bridge roller 29a disposed between the guide rollers 12a and 12b contacts the carbon fiber filament groups 26. FIG. 5B illustrates an example in which the bridge roller 29a disposed between the guide rollers 12a and 12b bends the carbon fiber filament groups 26. FIG. 5C illustrates an example in which the bridge rollers 29a and 29h disposed between the guide rollers 12a and 12b nip the carbon fiber filament groups 26. FIG. 5D illustrates an example in which the bridge rollers 29a and 29b disposed between the guide rollers 12a and 12b contact the carbon fiber filament groups 26. FIG. 5E illustrates an example in which the bridge rollers 29a and 29b disposed between the guide rollers 12a and 12b bend the carbon fiber filament groups 26. In this manner, the bridging fibers can be generated by bringing the carbon fiber filament groups into contact with the bridge rollers or bending the carbon fiber filament groups while passing therethrough. The bridge rollers 29a and 29b may be fixed, rotate, or vibrate in the width direction. FIG. 6 is a perspective view of FIG. 5B.

<Bar Spreading Process+Resin Powder Applying Process>

As a modified example of the embodiment of FIG. 4, the spreading rollers may be replaced with spreading bars.

Further, the position of the spreading bars can be changed. The spreading bar is, e.g., a plate-like body having a length long enough to come into contact with the full width in the width direction of the tows and having a predetermined thickness. The part of the spreading bar (the upper and lower surfaces) that comes into contact with the tows has a curved surface, and the bar as a whole has a vertically elongated oval cross section. The main portion of a spreading device includes one set of a spreading bar for holding tows (fixed spreading bar) and a spreading bar that vibrates in the width direction of the tows (vibrating spreading bar). Alternatively, the main portion may include a plurality of sets of the spreading bars. Carbon fiber tows are fed from the feed bobbins 2 and pass through the fixed spreading bar and the vibrating spreading bar while being bent. The tows vibrate in the width direction by the vibrating spreading bar while being held by the fixed spreading bar. Thus, the tows are opened and spread in the width direction to form a spread fiber sheet. As a preferred embodiment, two fixed spreading bars are disposed on the upper and lower sides, and tows are fed from the two directions of the upper and lower sides of the fixed spreading bars to make the tows separately pass over or under the vibrating spreading bar to spread the tows. The tows fed from the feed bobbins can be spread individually in the spreading process. At this time, one tow passing over the fixed spreading bar located on the lower side passes under the vibrating spreading bar, and another tow passing under the fixed spreading bar located on the upper side passes under the vibrating spreading bar. In this mode, the tows are opened and spread in the width direction of one tow, and after spreading, the spread tows are arrayed in a row in a sheet shape. After passage through a guide roller 12c, a spread carbon fiber sheet is formed (bar spreading process). This process does not include a bridging fiber generating process because bridging fibers are generated in the spreading process.

Then, dry resin powder 10 is sprinkled on the front surface of the spread fiber sheet from the powder feed hopper 9, and the sheet is fed into the heater 11 in a pressure-free state to heat and melt the dry resin powder 10, and cooled between the guide rollers 12e to 12g. Thereafter, dry resin powder 14 is sprinkled on the back surface of the spread fiber sheet from the powder feed hopper 13, and the sheet is fed into the heater 15 in a pressure-free state to heat and melt the dry resin powder 14, and cooled and taken up on the take-up roller 16 (resin powder applying process). The dry resin powders 10 and 14 are, e.g., phenoxy resin (flow starting temperature: 180° C.), the temperatures inside the heaters 11 and 15 are at or above the melting point or flow starting temperature of the resin, and the residence times therein are 4 seconds each. Thus, the spread carbon fiber sheet can be strong in the width direction and handled as a sheet without separation of the constituent carbon fibers.

For application of the resin powder, powder coating, electrostatic coating, spraying, fluidized-bed coating or the like may be adopted. Powder coating is preferred in which resin powder is dropped on the surface of a carbon fiber sheet. For example, dry resin powder is sprinkled on a carbon fiber sheet.

It is preferred that a plurality of carbon fiber filament groups, each being wound on a bobbin, are fed, and opened and spread in the width direction of the carbon fiber filament groups, and bridging fibers are generated by bridge rollers to form a single spread carbon fiber resin sheet not fully impregnated with resin. This is a semipreg. By this method, bridging fibers can be generated that are separated from the carbon fiber filament groups.

The shape of the bridge rollers is not particularly limited as long as the surface of the bridge rollers that comes into contact with the carbon fiber filament groups is a curved surface, and the cross section thereof may be, e.g., circular, elliptical, or oval. The bridge rollers with corners may cut filaments when the carbon fiber filament groups are brought into contact with the bridge rollers. The bridge rollers may have a pearskin finish surface with concavities and convexities, or a mirror surface without concavities and convexities.

The mode of generating the bridging fibers by the bridge rollers is not particularly limited as long as the bridging fibers are generated. The bridging fibers are generated by friction caused when the bridge rollers come into contact with the spread carbon fiber filament groups. One bridge roller may be disposed to push against the spread carbon fiber filament groups. At this time, the bridge roller may be fixed, rotate, or vibrate.

As another mode, two guide rollers may be disposed, and a bridge roller may be disposed therebetween to push against the spread carbon fiber filament groups while the carbon fiber filament groups pass therethrough. At this time, the bridge roller may be disposed on either the upper surface or the lower surface of the tows. The bridge roller may be disposed on both the upper surface and the lower surface of the tows.

As still another mode, two bridge rollers may be disposed to press the spread carbon fiber filament groups while the carbon fiber filament groups pass therethrough. At this time, the bridge rollers may rotate.

As still another mode, two guide rollers may be disposed, and a bridge roller vibrating in the width direction of the tows may be disposed therebetween to push against the spread carbon fiber filament groups while the carbon fiber filament groups pass therethrough. At this time, the bridge roller may be disposed on either the upper surface or the lower surface of the tows. The bridge roller may be disposed on both the upper surface and the lower surface of the tows.

As still another mode, the spreading bar may function as the bridge roller during spreading, and the carbon fiber filament groups may be brought into contact with the spreading bar while passing therethrough. The number of the spreading bar that functions as the bridge roller may be one or two or more. The spreading bar may vibrate in the width direction of the tows. At this time, the spreading bar may be disposed on either the upper surface or the lower surface of the tows. The spreading bar may be disposed on both the upper surface and the lower surface of the tows.

The spreading bars or bridge rollers can efficiently control the generation of the bridging fibers. The carbon fiber sheet of the present invention is preferably a carbon fiber reinforced resin intermediate for a fiber reinforced resin molded product, which is formed by applying heat and pressure on a plurality of stacked carbon fiber sheets. A fiber reinforced resin molded product also can be formed from one carbon fiber sheet of the present invention.

In the spreading process, the carbon fiber filament groups (carbon fiber tows before spreading) are preferably spread by one or more sets of spreading devices, each set including a spreading bar for bending and conveying tows (fixed spreading bar) and a spreading bar that vibrates in the width direction of the tows (vibrating spreading bar). The tows vibrate in the width direction by the vibrating spreading bar while being held by the fixed spreading bar. Thus, the tows are opened and spread in the width direction. The spreading bar is a plate-like body having a length long enough to come into contact with the full width in the width direction of the tows and having a predetermined thickness. The part of the spreading bar that comes into contact with the tows has a curved surface. The spreading bar preferably has a circular, elliptical, or oval cross section. Among them, the oval cross section is preferred. In particular, the spreading bar preferably has a vertically elongated oval cross section because its upper and lower surfaces may come into contact with the tows. It is preferred that the spreading process uses 2 to 4 sets of spreading devices, each set including the fixed spreading bar and the vibrating spreading bar. With this configuration, the tows can be spread efficiently.

A difference in height ΔH between the end of the fixed spreading bar (the part that comes into contact with the tows) that bends and conveys the carbon fiber filament groups (carbon fiber tows before spreading) and the end of the vibrating spreading bar (the part that comes into contact with the tows) in the spreading process is preferably 5 to 30 mm, and more preferably 8 to 20 mm. The carbon fiber tows are bent by an amount corresponding to the difference in height ΔH and pass therethrough, so that they are brought into contact with the surface of the vibrating spreading bar and spread easily. The difference in height ΔH may be large at the beginning and gradually become smaller. The operating amplitude of the spreading bar is preferably 1 to 20 mm, and more preferably 2 to 10 mm. The operating frequency of the spreading bar is preferably 10 to 100 Hz, and more preferably 15 to 50 Hz. Thus, the tows can be spread efficiently.

Figure 2:
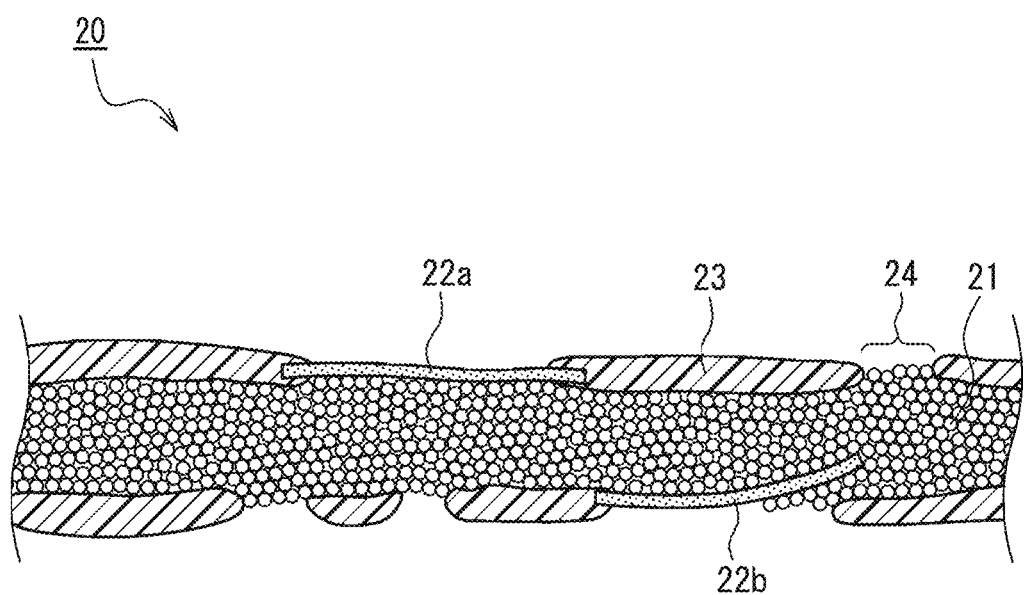
FIG. 2 is a schematic cross-sectional view of the resin-integrated carbon fiber sheet.

FIG. 1 is a schematic perspective view of a resin-integrated carbon fiber sheet 20 according to an embodiment of the present invention, and FIG. 2 is a schematic cross-sectional view of the resin-integrated carbon fiber sheet 20. Bridging fibers (multidirectional fibers) 22 are oriented in various directions on the surface of a spread carbon fiber sheet 21. Melt-solidified resin 23 adheres to the surface of the carbon fiber sheet 21. The resin 23 is not impregnated inside the carbon fiber sheet 21 or is only partially impregnated in the carbon fiber sheet 21. The resin 23 adhesively fixes the bridging fibers 22 to the surface of the carbon fiber sheet 21. As illustrated in FIG. 2, bridging fibers 22a and 22b are present on the surfaces of the carbon fiber sheet 21. The bridging fibers 22a and 22b are partially present on the surface of the carbon fiber sheet 21, and partially enter the carbon fiber sheet 21 and cross carbon fibers. This is a result of generating bridging fibers during or after tow spreading. The resin 23 adhesively fixes the bridging fibers 22 to the surface of the carbon fiber sheet 21. The carbon fiber sheet 21 includes parts to which the resin 23 adheres and parts 24 to which the resin 23 does not adhere. The parts 24 to which the resin does not adhere serve as paths through which air inside the carbon fiber sheet escapes during formation of a fiber reinforced resin molded product by applying heat and pressure on a plurality of stacked resin-integrated carbon fiber sheets 20. The application of pressure enables the surface resin to be easily impregnated into the entire fiber sheet. As a result, the resin 23 becomes a matrix resin of the carbon fiber sheet 21.

Figure 7:
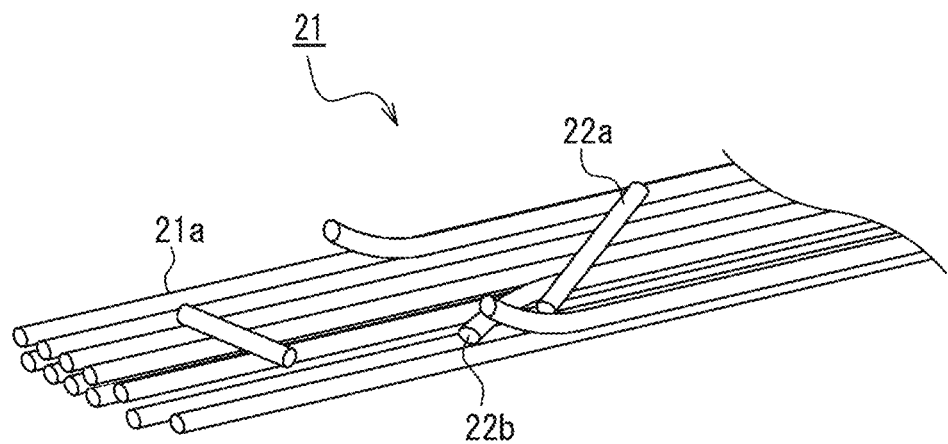
FIG. 7 is a schematic perspective view of a carbon fiber sheet according to an embodiment of the present invention.

FIG. 7 is a schematic perspective view of a carbon fiber sheet according to an embodiment of the present invention. The carbon fiber sheet 21 includes a unidirectional long-fiber group 21a spread and arrayed in one direction, and bridging fibers (multidirectional fibers) 22a and 22b derived from the unidirectional long-fiber group 21a. The bridging fibers 22a and 22b are partially present on the surface of the carbon fiber sheet 21 and partially enter the carbon fiber sheet 21 and cross the carbon fibers. Owing to the generation of the bridging fibers 22a and 22h, cut faces, breakages, scratches and the like are left on the carbon fibers, and they modify the surface of the carbon fiber sheet, whereby a fiber reinforced resin molded body having high interlaminar fracture toughness can be obtained.

Figure 8A:
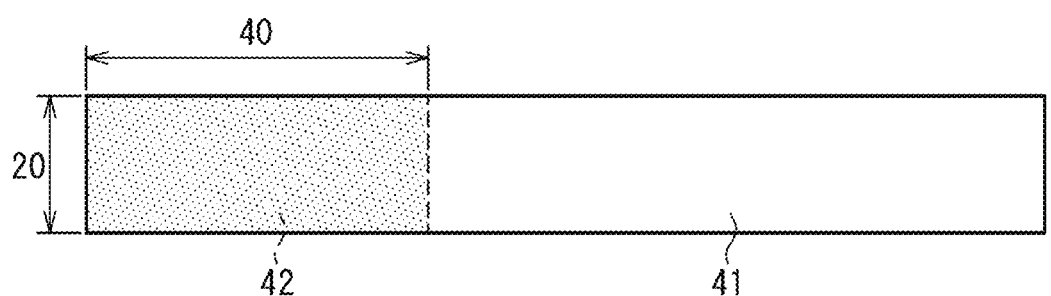
FIG. 8A is a plan view of a specimen of a fiber reinforced resin molded body to be subjected to an interlaminar fracture toughness test.
Figure 8B:
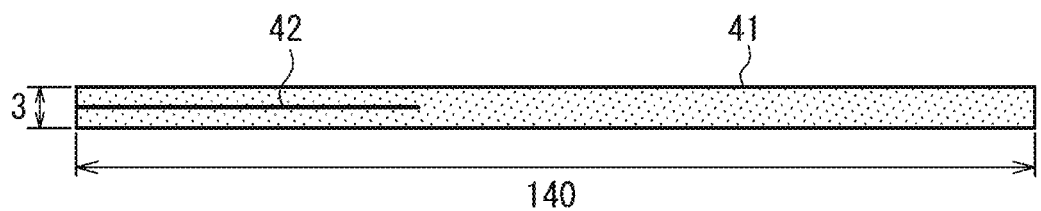
FIG. 8B is a cross-sectional view of the same.

FIG. 8A is a plan view of a specimen 41 of a fiber reinforced resin molded body to be subjected to an interlaminar fracture toughness test, and FIG. 8B is a cross-sectional view of the specimen. The fiber reinforced resin molded body is prepared by stacking 34 resin-integrated carbon fiber sheets, inserting a polyimide film. 42 in the midplane at one end of the stack as viewed cross-sectionally and subjecting it to pressure molding under 3 MPa at 260° C. for 10 minutes. Numerical values indicated next to arrows represent lengths (unit: mm).

Figure 9:
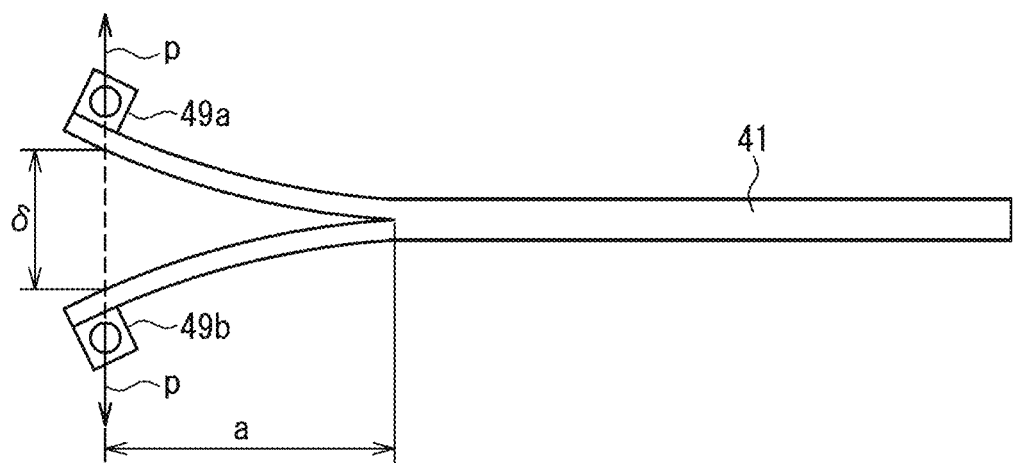
FIG. 9 is a schematic explanatory view illustrating an interlaminar fracture toughness test (Mode I).

FIG. 9 is a schematic explanatory view illustrating a Mode I interlaminar fracture toughness test. The Mode I interlaminar fracture toughness test is specified in JIS K 7086 and conducted with a DCB (double cantilever beam) test jig such as that illustrated in FIG. 9. Specifically pin loading blocks 49a and 49b are bonded to the both surfaces at one end of the specimen 41, and a load is applied in the directions of the arrows to measure a load P, a load-line opening displacement (COD) δ, and a crack length a.

Figure 10A:
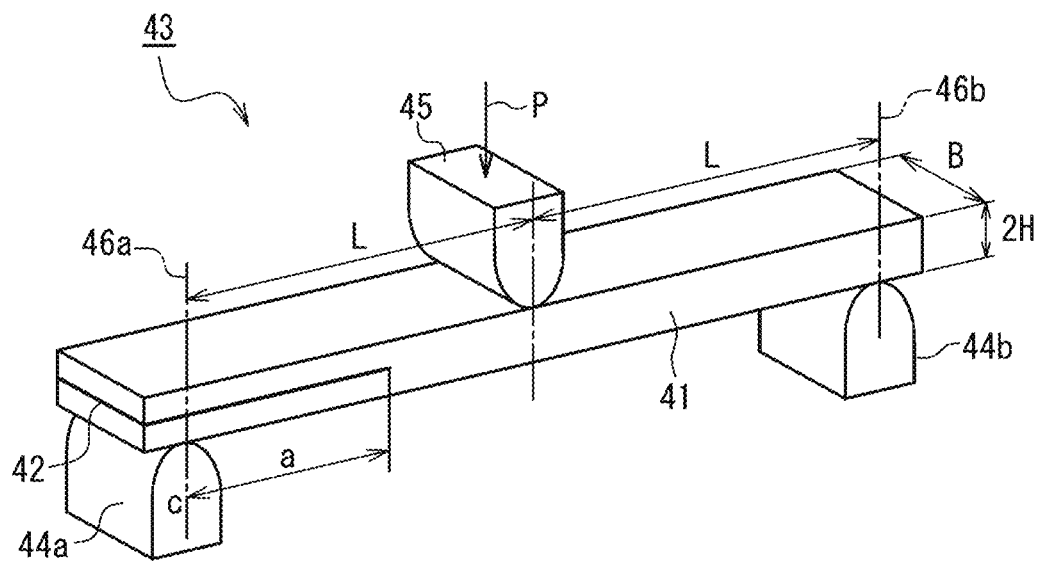
FIGS. 10A and B are schematic explanatory perspective views illustrating an interlaminar fracture toughness test (Mode II).

FIGS. 10A and B are schematic explanatory perspective views illustrating a Mode II interlaminar fracture toughness test. The Mode II interlaminar fracture toughness test is specified in JIS K 7086 and conducted with an ENF (end notched flexure) test device such as that illustrated in FIG. 10. Specifically, in a test device 43 illustrated in FIG. 10, the specimen 41 is supported by two fulcrums 44a and 44b, a load 45 is placed at the center of the specimen, and a bending test was performed to measure a load P, a crack length a, and a load-point displacement. 46a and 46b are reference lines. A pressing force applied to the load 45 on the center of the specimen imposes stress on the specimen as indicated by arrows 47a and 47b, and a crack 48 appears from a portion of the polyimide film 42, which is in the midplane at one end of the stack. The pressing force immediately before crack initiation is a maximum value of the load (N).

EXAMPLES

Hereinafter, the present invention will be described specifically by way of examples. However, the present invention is not limited to the following examples.

<Interlaminar Fracture Toughness Test>

The Mode I interlaminar fracture toughness GIC and the Mode II interlaminar fracture toughness GIIC were determined in accordance with JIS K7086: 1993.

A. Mode I Interlaminar Fracture Toughness GIC

<DCB Test>

Load and displacement values of prepared samples were measured with the DCB test jig illustrated in FIG. 9 to determine the Mode I interlaminar fracture toughness GIC from Formulae 1 and 2 below.

$$G_{IC} = \frac{3}{2H}\left(\frac{P_C}{B}\right)^2 \frac{(B\lambda_0)^{\frac{2}{3}}}{\alpha_1}$$ [Formula 1]

$$\alpha_1 = 10 D_1 (E_L)^{\frac{1}{2}}$$ [Formula 2]

wherein

PC: Initial critical load [N]

EL: Bending elastic modulus [GPa]

λ0: Compliance of the diagram for initial straight line in the load to COD relationship [mm/N]

D1: Dimensionless coefficient (D1 ≃0.25)

B: Width of specimen [mm]
2H: Thickness of specimen [mm]

B. Mode II Interlaminar Fracture Toughness GIIC
<ENF Test>

Figure 10B:
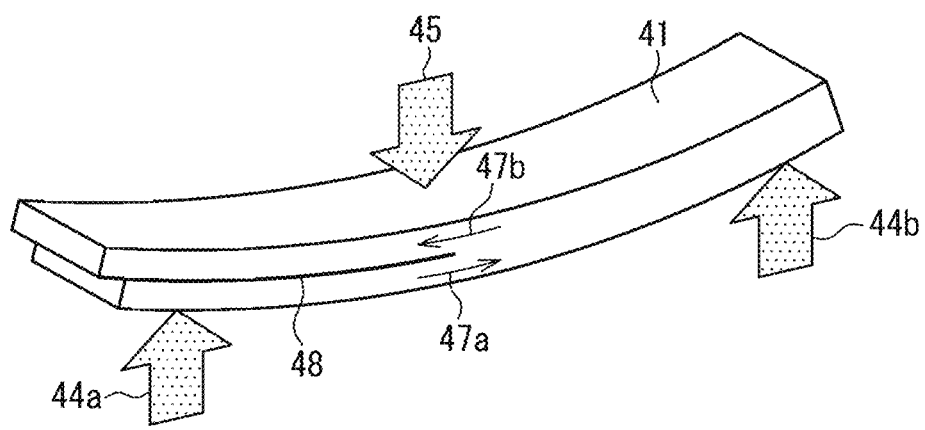

Load and displacement values of prepared samples were measured with the ENF test device illustrated in FIGS. 10A and 10B to determine the Mode II interlaminar fracture toughness GIIC from Formulae 3 and 4 below.

$$G_{IIC} = \frac{9a_1^2 P_C^2 C_1}{2B(2L^3 + 2a_1^3)} \quad \text{[Formula 3]}$$

$$a_1 = \left\{ \frac{C_1}{C_0} a_0^3 + \frac{2}{3}\left(\frac{C_1}{C_0} - 1\right)L^3 \right\}^{\frac{1}{3}} \quad \text{[Formula 4]}$$

wherein
PC: Initial critical load [N]
a0: Initial crack length [mm]
a1: Estimated crack length at initial critical load [mm]
C0: Load point compliance at the initial elastic portion [mm/N]
C1: Load point compliance for the initial critical load [mm/N]
B: Width of specimen [mm]
L: Longitudinal dimension of specimen [mm]

<Test 1>

The tensile strength of spread fibers from which bridging fibers had been generated and the tensile strength of spread fibers from which bridging fibers had not been generated were measured to make comparison. For accurate comparison of the tensile strength, spread fibers not combined with resin were used.

Example 1

(1) Carbon Fiber Tow

A carbon fiber tow manufactured by MITSUBISHI CHEMICAL CORPORATION was used (product number: PYROHLE TR 505151, form: regular tow, filament count: 15K (15,000 filaments), filament diameter: 7 μm). An epoxy-based compound as a sizing agent was applied to carbon fibers of the carbon fiber tow.

(2) Preparation of Spread. Fibers

The tow was spread with a modified spreading device of FIG. 4. Specifically, fixed spreading bars and vibrating spreading bars were disposed alternately so that the carbon fiber filament group passed through six spreading bars. The vibrating spreading bars were disposed on upper and lower sides. All the spreading bars had a vertically elongated oval cross section. Since sprinkling of resin powder was not performed and the heaters were not used, the obtained spread fibers were simply spread fibers resulting from spreading of the tow of carbon fibers as raw fibers. The tension of the carbon fiber filament group (tow) during supply from the feed bobbin to the spreading process was 10 N per supply bobbin. The operating amplitude of the vibrating spreading bars was 6 mm, and the operating frequency was 20 Hz. The take-up speed of the spread fiber sheet was 10 m/min. In this manner, dry spread fibers including 15,000 carbon fiber filaments and having a spread width of 12.5 mm and a thickness of 0.2 mm were prepared. The mass of the spread fiber sheet was 80 g/m².

(3) Tensile Test of Spread Fibers

The conditions for the tensile test of the dry spread fibers were set as below. The dry spread fibers were cut out from the bobbin to a length of about 250 mm to prepare a sample. The length and the mass of the dry spread fibers as a sample were gently measured so as not to drop bridging fibers. A temporary cross-sectional area of the sample was calculated from the length, mass, and density (1.82 g/cm³ for the carbon fibers this time).

An adhesive (Araldite) was applied to one side of two thick papers (width 30 mm×length 50 mm). The sample was placed on one of the thick papers, and the other thick paper was placed thereon so that the sample was sandwiched between the adhesive sides of the thick papers. A 500 g weight was placed thereon from the above and left for at least 24 hours. This was performed for both ends of the sample to prepare a tensile test specimen.

immediately before the tensile test (20 minutes before the test at the latest), a solvent having a viscosity not affecting the strength was applied to and impregnated in the carbon fibers held between the thick papers. By doing this, it was possible to prevent an impact of breakage of a filament from being transmitted to other filaments during the tensile test and prevent the measured strength from being lower than the actual strength. The solvent this time was an epoxy resin: bisphenol F type (S-830 manufactured by DIC CORPORATION) diluted to 50% with ethanol.

The thick paper parts of the specimen were placed at tensile test grippers, and the tensile test was performed at a speed of 20 mm/mm to measure the maximum load and determine the strength by dividing the maximum load by the apparent cross-sectional area of each sample calculated earlier.

Example 2

Spread fibers of Example 2 were prepared in the same manner as in Example 1 except that the tension applied to the carbon fiber tow was changed to 15N in the process of (2) Preparation of Spread Fibers described above. A sample of Example 2 was produced in the same manner as in Example 1 using the spread fibers, and the test was performed.

Comparative Example 1

In the process of (2) Preparation of Spread Fibers described above, the tow was spread using the air spreading device illustrated in FIG. 3. Since sprinkling of resin powder was not performed and the heaters were not used, the obtained spread fibers were simply spread fibers resulting from spreading of the tow of carbon fibers as raw fibers. The tension of the carbon fiber filament group (tow) during supply from the feed bobbin to the spreading process was 10 N per supply bobbin. The carbon fiber filament group 26 was nipped between a plurality of nip rollers 30a and 30b, between which a deflection space 28 was provided between holding rollers 27a and 27b. The carbon fiber filament group 8 was conveyed while air inside the deflection space 28 was being withdrawn. Thus, the carbon fiber filament group 26 was spread. The other conditions were the same as above.

A sample of Comparative Example 1 was produced in the same manner as in Example 1 using the spread fibers, and the test was performed.

<Test 2>

The amount of the bridging fibers on the surfaces of the spread fiber sheets was measured. The amount of the bridging fibers on a spread fiber sheet from which bridging fibers (multidirectional fibers) had been generated and the amount of the bridging fibers on a spread fiber sheet from which bridging fibers had not been generated were compared in terms of mass. For accurate measurement of the amount of the bridging fibers, spread fiber sheets not combined with resin were used.

Example 3

(1) Carbon Fiber Tow

Carbon fiber tows manufactured by MITSUBISHI CHEMICAL CORPORATION were used (product number: PYROFILE TR 50S15L, form: regular tow, filament count: 15K (15,000 filaments), filament diameter: 7 μm). An epoxy-based compound as a sizing agent was applied to carbon fibers of the carbon fiber tows.

(2) Preparation of Spread Fiber Sheet

Figure 21:
FIG. 21 is an enlarged photograph (7 mm×7 mm) of the surface of a spread carbon fiber sheet according to Example 3 of the present invention.

Tows were spread with the spreading device of Example 1. Since sprinkling of resin powder was not performed and the heaters were not used, the obtained spread fibers were simply spread fibers resulting from spreading of the tows of carbon fibers as raw fibers. The tension of the carbon fiber filament group (tow) during supply from the feed bobbin to the spreading process was 10 N per supply bobbin. The operating amplitude of the vibrating spreading bars was 6 mm, and the operating frequency was 20 Hz. The take-up speed of the spread fiber sheet was 10 m/min. In this manner, a dry spread fiber sheet including 40 tows, each tow including 15,000 carbon fiber filaments, and having a spread width of 500 mm and a thickness of 0.2 mm was prepared. The mass per unit area of the spread fiber sheet was 80 g/m$^2$. FIG. 21 is a photograph (7 mm×7 mm) of the surface of the resultant spread fiber sheet.

(3) Measurement of Mass of Bridging Fibers on Spread Fiber Sheet

The amount of the bridging fibers exposed on the surfaces of the spread fiber sheets was measured. In the measurement, the spread fiber sheet was cut to a size of 50 mm×50 mm to prepare a sample, and only bridging fibers exposed to the surfaces of the sample were carefully taken out. The mass of the bridging fibers was measured with an electronic balance to determine the amount of the bridging fibers per unit area (g/m$^2$).

Example 4

Figure 23:
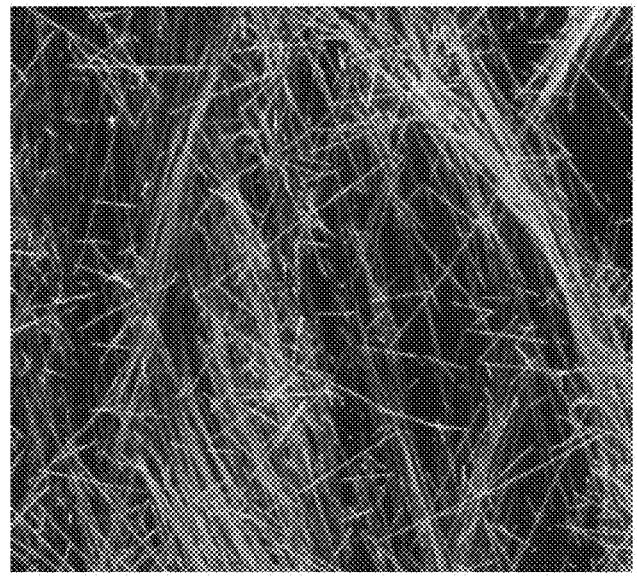
FIG. 23 is an enlarged photograph (7 mm×7 mm) of the surface of a spread carbon fiber sheet according to Example 4 of the present invention.

A spread fiber sheet of Example 4 was prepared in the same manner as in Example 3 except that the tension applied to the carbon fiber tows was changed to 15N in the process of (2) Preparation of Spread Fiber Sheet described above. FIG. 23 is a photograph (7 mm×7 mm) of the surface of the resultant spread fiber sheet. A sample of Example 4 was produced in the same manner as in Example 3 using this spread fiber sheet, and the amount of the bridging fibers was measured.

Comparative Example 2

Figure 24:
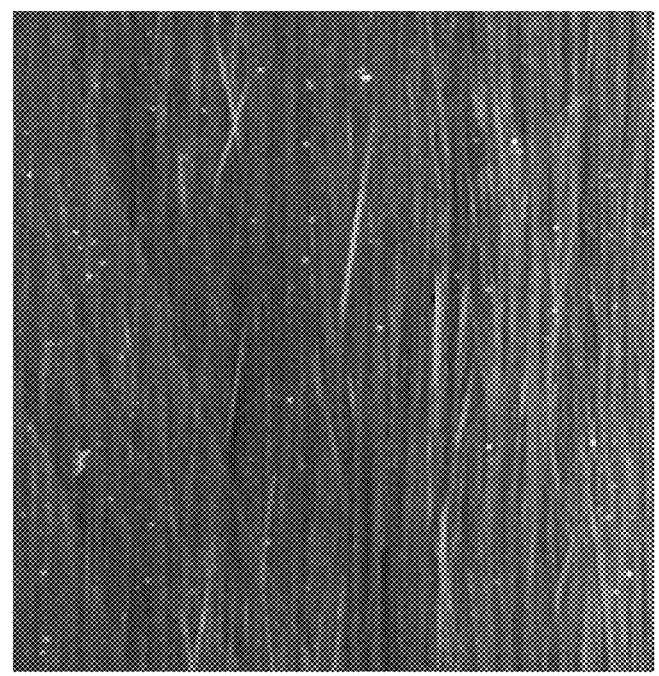
FIG. 24 is an enlarged photograph (7 mm×7 mm) of the surface of a spread carbon fiber sheet according to Comparative Example 2.

A sample of Comparative Example 2 was produced in the same manner as in Example 3 using the spread fiber sheet of Comparative Example 1, and the amount of the bridging fibers was measured. FIG. 24 is a photograph (7 mm×7 mm) of the surface of the spread fiber sheet.

Figure 11:
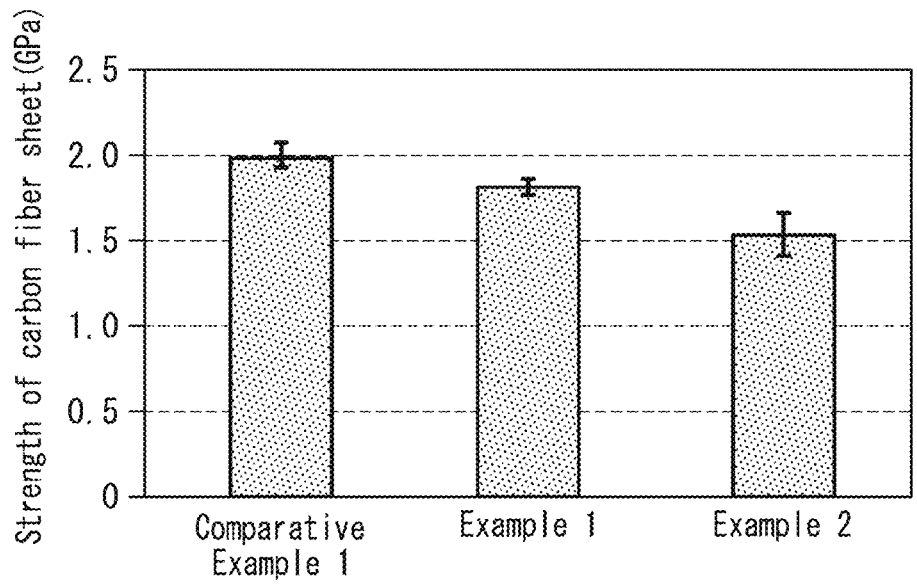
FIG. 11 is a graph illustrating the strength of carbon fiber sheets of Examples 1-2 of the present invention and Comparative Example 1.
Figure 12:
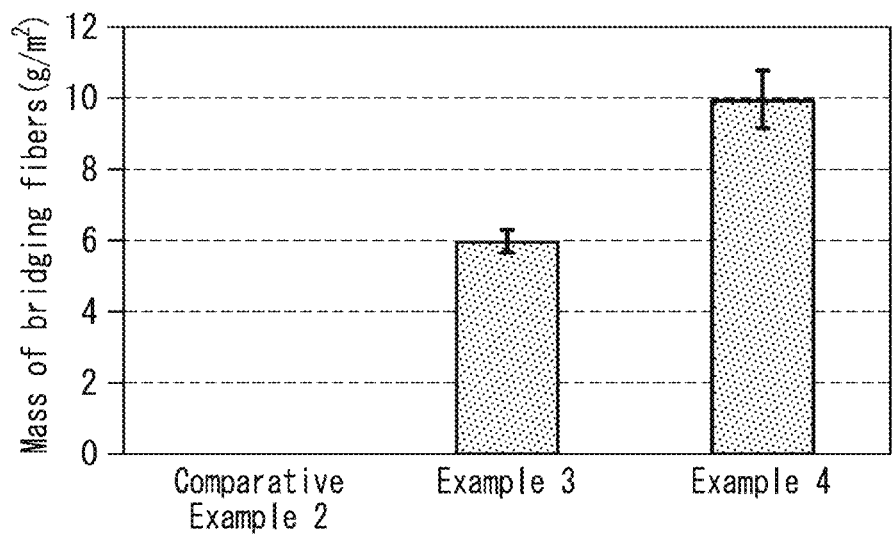
FIG. 12 is a graph illustrating the mass of bridging fibers of Examples 3-4 of the present invention and Comparative Example 2.
Figure 13:
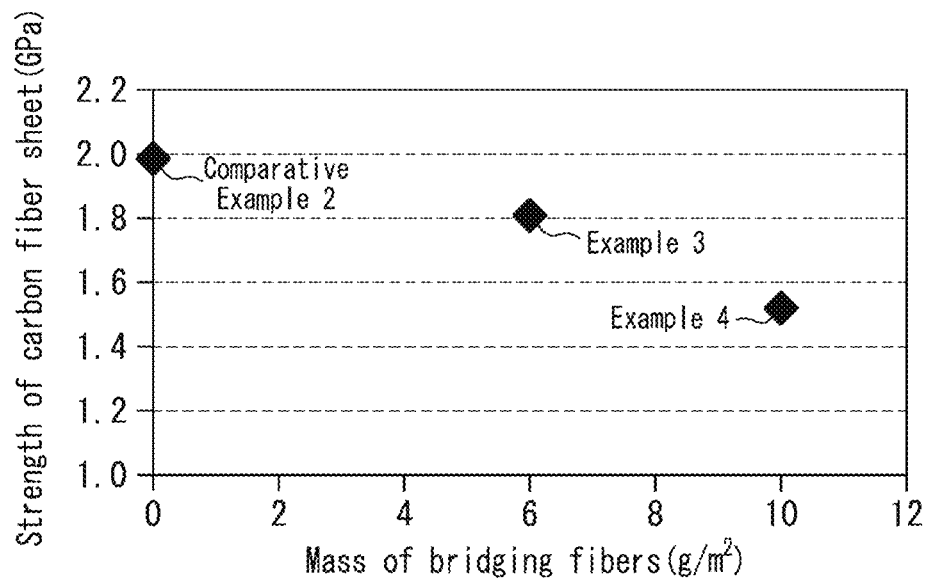
FIG. 13 is a graph illustrating the mass of the bridging fibers and the strength of the carbon fiber sheets of the same.

Table 1 and FIGS. 11 to 13 summarize the results of the spread fibers and the spread fiber sheets. FIG. 11 is a graph illustrating the strength of the carbon fibers of Test 1. FIG. 12 is a graph illustrating the mass of the bridging fibers of Test 2. FIG. 13 is a graph illustrating the mass of the bridging fibers and the strength of the carbon fibers of Tests 1 and 2.

TABLE 1

|  | Example 1 | Example 2 | Comparative Example 1 |
|---|---|---|---|
| Strength of carbon fibers (GPa) | 1.81 | 1.52 | 1.98 |

|  | Example 3 | Example 4 | Comparative Example 2 |
|---|---|---|---|
| Mass of carbon fiber sheet (g/m$^2$) | 80 | 80 | 80 |
| Mass of bridging fibers (g/m$^2$) | 6.0 | 9.8 | 0 |
| Mass of bridging fibers (%) | 7.5 | 12.3 | 0 |

<Test 3>

The interlaminar fracture toughness of stacks of the spread fiber sheets was measured.

Example 5

(1) The tows were spread under the same conditions as those in the process of (2) Preparation of Spread Fiber Sheet of Example 3. Sprinkling of resin powder and heating with the heaters were performed to prepare a resin-integrated carbon fiber sheet including a spread fiber sheet whose fibers were unified with resin but not fully impregnated with resin, i.e., a semipreg. The material was the same as that of Example 3. Resin powder was applied to the both surfaces of the dry spread fiber sheet (80 g/m$^2$) so that the fiber content (Vf) would be 48% in the volume content of the fibers and the resin.

(2) Resin and Heat Treatment

Polyamide resin (PA6 manufactured by UBE INDUSTRIES, LTD., melting point: 225° C.) was used as dry resin powder. The median particle diameter of the dry resin powder was 80 μm. The average amount of the resin applied was 16.3 g on one surface (32.6 g on both surfaces) per 1 m$^2$ of the carbon fibers. The temperatures inside the heaters 11 and 15 were 240° C., and the residence times therein were 4 seconds each.

(3) Evaluation of Resin-Integrated Carbon Fiber Sheet

Figure 22:
FIG. 22 is an enlarged photograph (7 mm×7 mm) of the surface of a resin-integrated carbon fiber sheet according to Example 5 of the present invention.

The mass of the resultant resin-integrated carbon fiber sheet was 112.6 g/m$^2$. FIG. 22 is a photograph (7 mm×7 mm) of the surface of the resultant resin-integrated carbon fiber sheet.

(4) Preparation of Sample of Fiber Reinforced Resin Molded Body A. Mode I Interlaminar Fracture Toughness GIC To conduct the Mode I interlaminar fracture toughness GIC test, a specimen of a fiber reinforced resin molded body illustrated FIGS. 8A and 8B was prepared as a sample.

For preparation of the specimen, 34 spread fiber sheets (200×200 min) were stacked, with the fiber direction being aligned. A 15-μm-thick polyimide film was folded in two and inserted in place (75 mm from an end of the stack) in the midplane of the stack. The stack was hot-pressed under 3 MPa at 260° C. for 10 minutes using a 3 mm spacer, followed by cooling press under 3 MPa at 20° C. for 5 minutes. The stack of 200×200 mm×3 mm was cut to a width of 25 mm and a length of 140 mm to prepare a specimen (FIG. 8). Metal jigs were bonded to the specimen (sample) using an adhesive (Araldite) as illustrated in FIG. 9.

The DCB test illustrated in FIG. 9 was conducted using this sample to determine the Mode I interlaminar fracture toughness GIC.

B. Mode II Interlaminar Fracture Toughness GIIC

To conduct the Mode II interlaminar fracture toughness GIIC test, a specimen of a fiber reinforced resin molded body illustrated FIGS. 8A and 8B was prepared as a sample.

For preparation of the specimen, 34 spread fiber sheets (200×200 mm) were stacked, with the fiber direction being aligned. A 15-μm-thick polyimide film was folded in two and inserted in place (75 mm from an end of the stack) in the midplane at one end of the stack as viewed cross-sectionally. The stack was hot-pressed under 3 MPa at 260° C. for 10 minutes using a 3 mm spacer, followed by cooling press under 3 MPa at 20° C. for 5 minutes. The stack of 200×200 mm×3 mm was cut to prepare a specimen 8).

The ENF test illustrated in FIG. 10 was conducted using this sample to determine the Mode II interlaminar fracture toughness GIIC.

Example 6

The tows were spread under the same conditions as those in the process of (2) Preparation of Spread Fiber Sheet of Example 4, and the Mode I interlaminar fracture toughness GIC and the Mode II interlaminar fracture toughness GIIC were calculated under the conditions of Example 5.

Comparative Example 3

Figure 25:
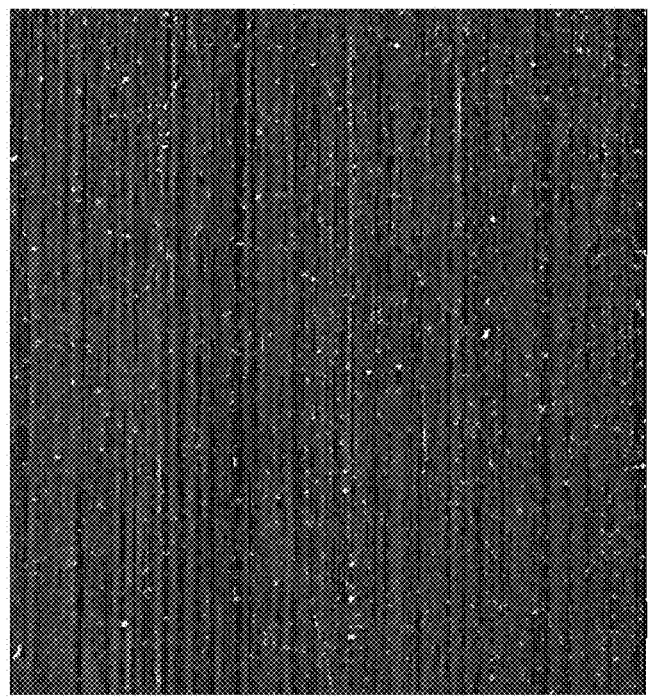
FIG. 25 is an enlarged photograph (7 mm×7 mm) of the surface of a prepreg according to Comparative Example 3.

A spread resin carbon fiber sheet manufactured by SAKAI OVEX CO., LTD., was used. The sheet was produced by air spreading. FIG. 25 is a photograph (7 mm×7 mm) of the surface of the sheet. The Mode I interlaminar fracture toughness GIC and the Mode II interlaminar fracture toughness GIIC were calculated under the conditions of Example 5.

Figure 14:
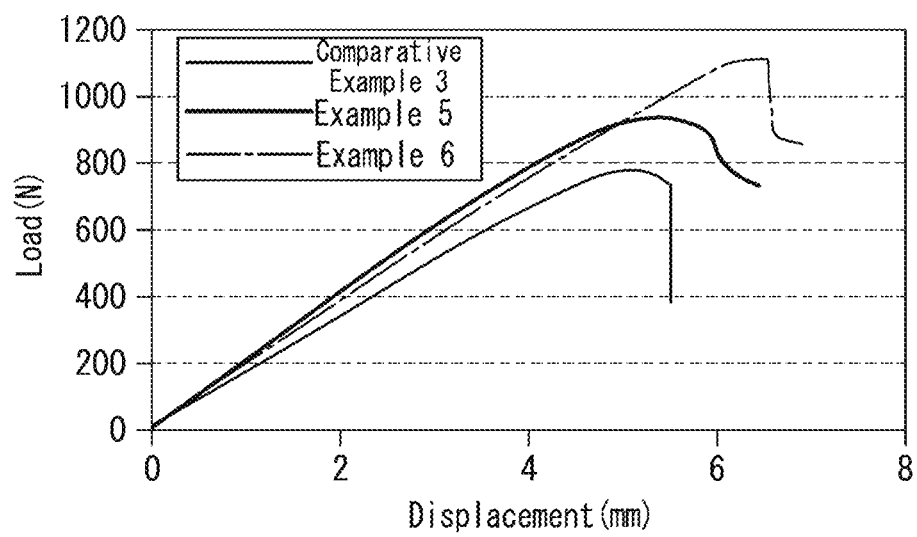
FIG. 14 is a graph illustrating the results of the interlaminar fracture toughness test on the load and the displacement of fiber reinforced resin molded bodies of Examples 5-6 of the present invention and Comparative Example 3.
Figure 15:
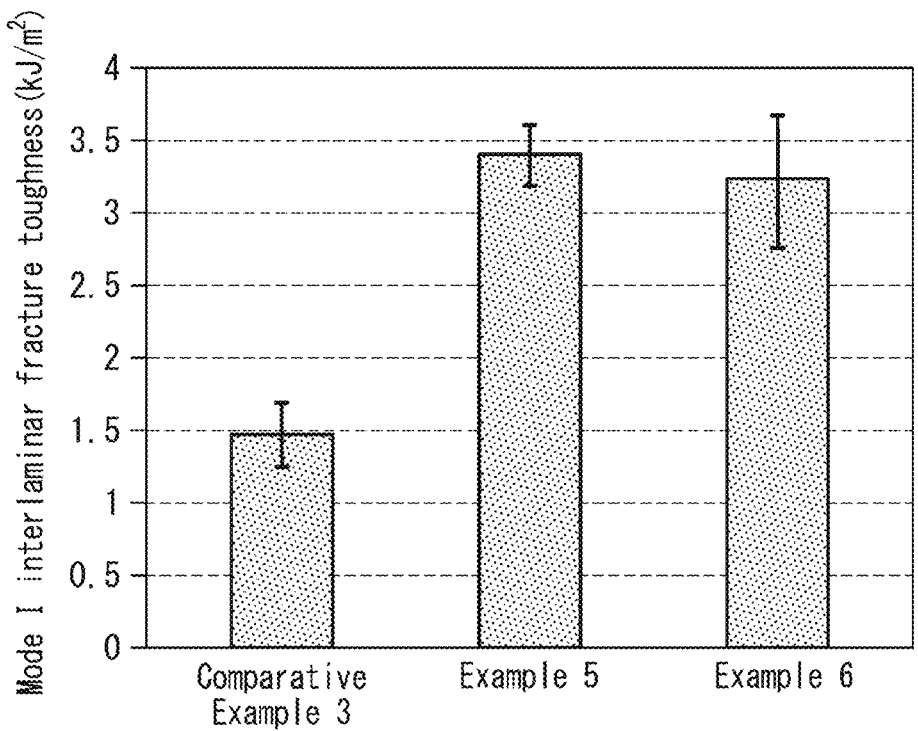
FIG. 15 is a graph illustrating the results of the Mode I interlaminar fracture toughness test of the fiber reinforced resin molded bodies of the same.
Figure 16:
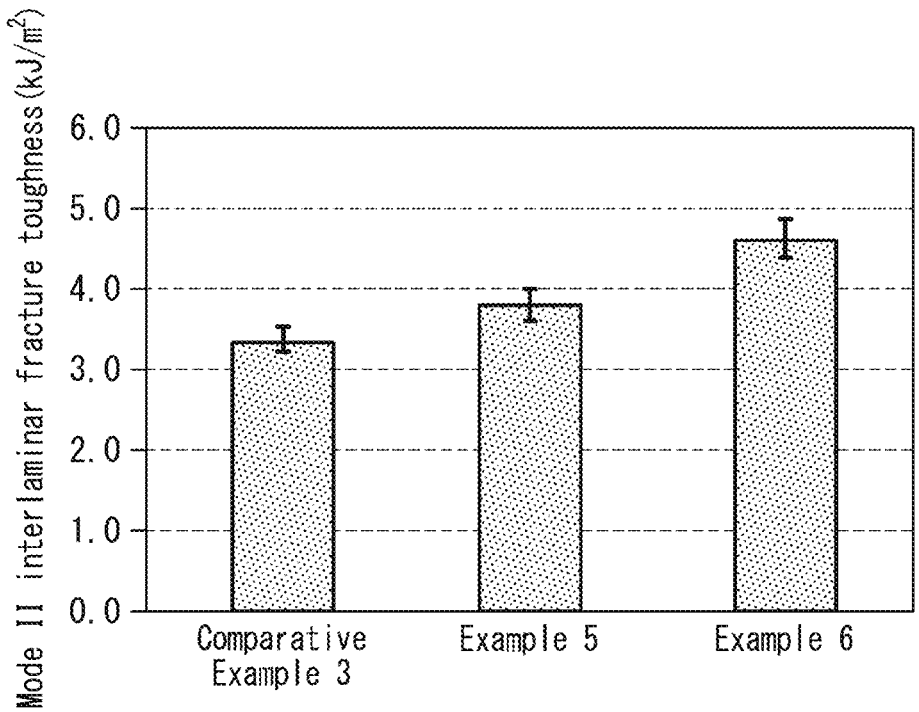
FIG. 16 is a graph illustrating the results of the Mode II interlaminar fracture toughness test of the fiber reinforced resin molded bodies of the same.
Figure 17:
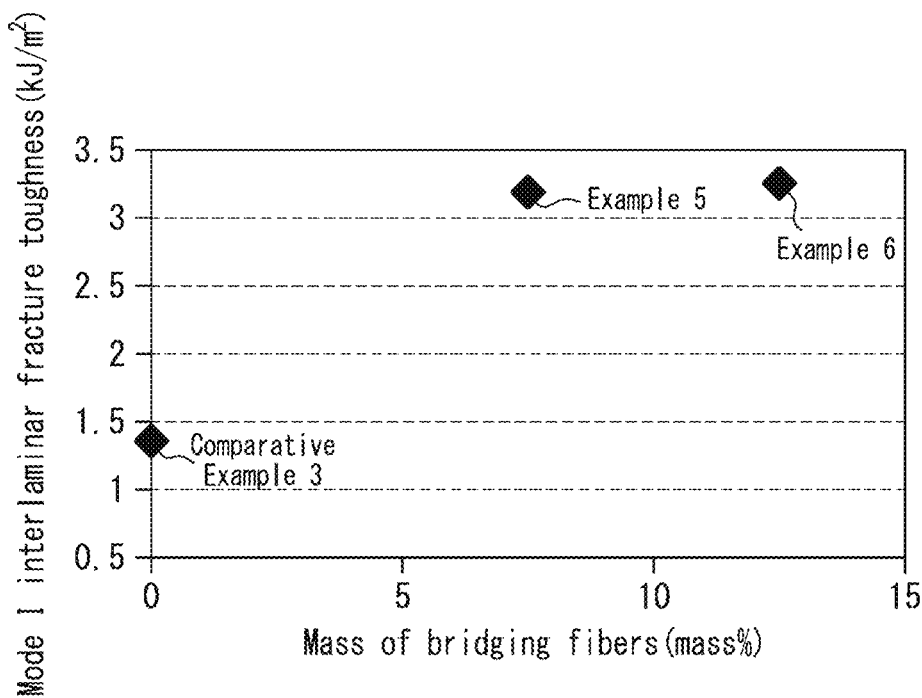
FIG. 17 is a graph illustrating a relationship between the mass of the bridging fibers and the property of the Mode I interlaminar fracture toughness of the same.
Figure 18:
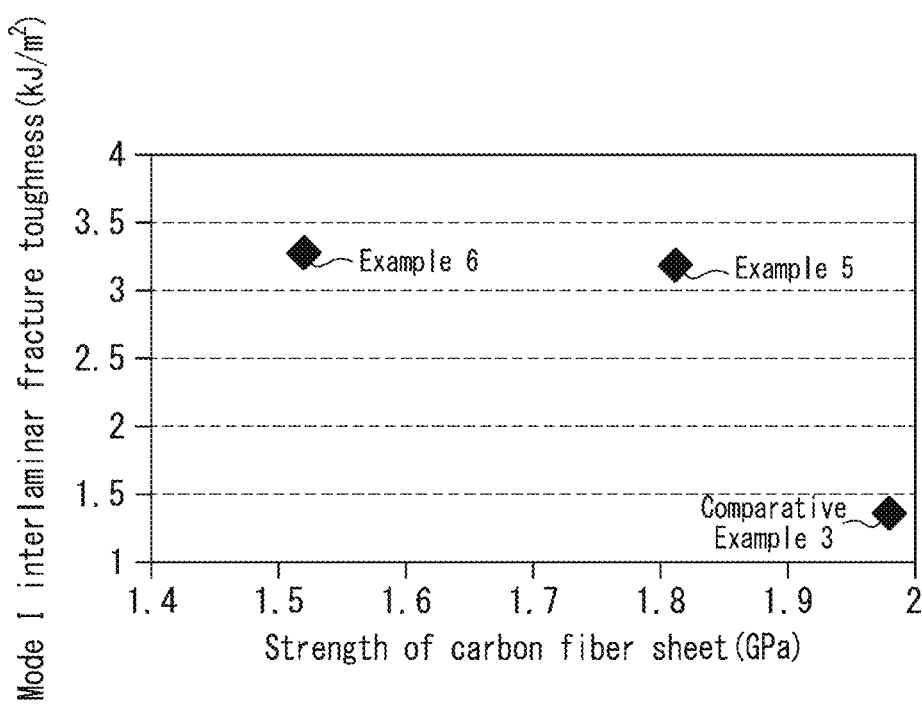
FIG. 18 is a graph illustrating a relationship between the strength of the carbon fiber sheets and the property of the Mode I interlaminar fracture toughness of the same.
Figure 19:
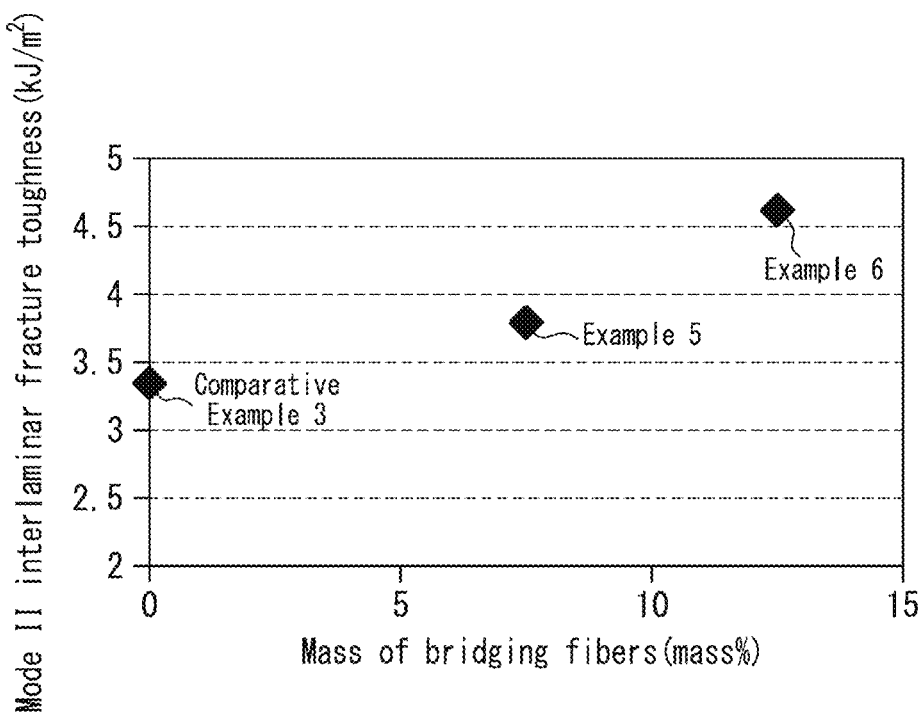
FIG. 19 is a graph illustrating a relationship between the mass of the bridging fibers and the property of the Mode II interlaminar fracture toughness of the same.
Figure 20:
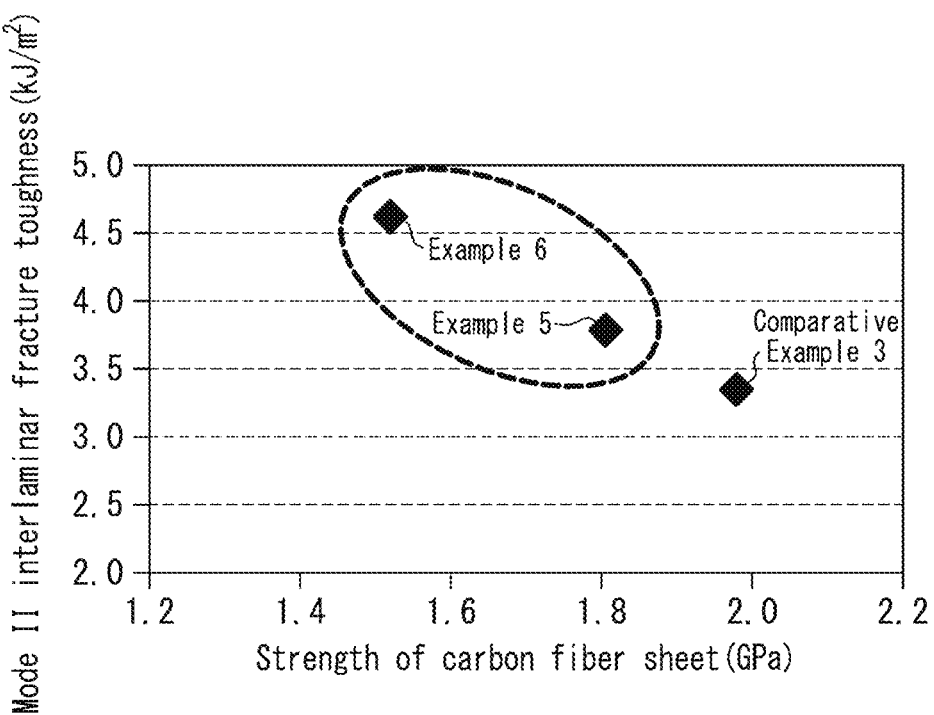
FIG. 20 is a graph illustrating a relationship between the strength of the carbon fiber sheets and the property of the Mode II interlaminar fracture toughness of the same.

Table 2 and FIGS. 14-20 summarize the results of the interlaminar fracture toughness test of Test 3. FIG. 14 is a graph illustrating the results of the interlaminar fracture toughness test on the load and the displacement of the fiber reinforced resin molded bodies of Examples 5-6 and Comparative Example 3. FIG. 15 is a graph illustrating the results of the Mode I interlaminar fracture toughness test of the fiber reinforced resin molded bodies of the same. FIG. 16 is a graph illustrating the results of the Mode II interlaminar fracture toughness test of the fiber reinforced resin molded bodies of the same. FIG. 17 is a graph illustrating a relationship between the mass of the bridging fibers and the property of the Mode I interlaminar fracture toughness of the same. FIG. 18 is a graph illustrating a relationship between the strength of the carbon fiber sheets and the property of the Mode I interlaminar fracture toughness of the same. FIG. 19 is a graph illustrating a relationship between the mass of the bridging fibers and the property of the Mode II interlaminar fracture toughness of the same. FIG. 20 is a graph illustrating a relationship between the strength of carbon fiber sheets and the property of the Mode II interlaminar fracture toughness of the same.

TABLE 2

|  | Example 5 | Example 6 | Comparative Example 3 |
|---|---|---|---|
| Spreading method | Vibration spreading | Vibration spreading | Air spreading |
| Resin | PA6 | PA6 | PA6 |
| Volume ratio of carbon fibers (Vf) | 48 | 48 | 48 |
| Mode I interlaminar fracture toughness GIC (kJ/m$^2$) | 3.2 | 3.3 | 1.4 |
| Change rate of Mode I interlaminar fracture toughness GIC (%) | 229 | 236 | 100 |
| Mode II interlaminar fracture toughness GIIC (kJ/m$^2$) | 3.79 | 4.62 | 3.34 |
| Change rate of Mode II interlaminar fracture toughness GIIC (%) | 113 | 138 | 100 |

The above results indicate that, as the number of the bridging fibers increases, the tensile strength decreases proportionally (FIG. 13), whereas the maximum load and the interlaminar fracture toughness in the interlaminar fracture toughness test increase. The mode I interlaminar fracture toughness of Example 5 and that of Example 6 were increased by about 129% and about 136%, respectively, as compared with that of Comparative Example 3. The mode II interlaminar fracture toughness of Example 5 and that of Example 6 were increased by about 13% and about 38%, respectively, as compared with that of Comparative Example 3.

INDUSTRIAL APPLICABILITY

The fiber reinforced resin molded body of the present invention is suitable for applications in aircraft, railroad vehicles, ships, automobiles, sports goods, and other general industrial applications in building members such as windmills, pressure vessels, and the like.

DESCRIPTION OF REFERENCE NUMERALS

2 Feed bobbin
9, 13 Powder feed hopper
10, 14 Dry resin powder
11, 15 Heater
12a-12g Guide roller
16 Take-up roller
20 Resin-integrated carbon fiber sheet
21 Carbon fiber sheet
21a Unidirectional carbon fiber group
22, 22a, 22b Bridging fibers (multidirectional fibers)
23 Resin
24 Part to which resin does not adhere
25 Air spreading process
26 Carbon fiber filament group
27a, 27b Holding roller
28 Deflection space
29a-29d Bridge roller
30a, 30b, 30c Nip roller
31a-31j Spreading roller
32 Roller spreading process
33 Bridging fiber generating process
34 Resin powder applying process
41 Specimen of fiber reinforced resin molded body
42 Polyimide film
43 Interlaminar fracture toughness test device
44a, 44b Fulcrum
45 Load 46a, 46b Reference line
47a, 47b Stress direction
48 Crack
49a, 49b Pin loading block

The invention claimed is:

1. A fiber reinforced resin molded body, comprising:
resin-integrated carbon fiber sheets that are stacked and unified by a molding process, each of the resin-integrated carbon fiber sheets comprising a carbon fiber sheet and at least one resin selected from a group consisting of thermoplastic resin and thermosetting resin,
wherein
the carbon fiber sheet for each of the resin-integrated carbon fiber sheets comprises:
a unidirectional long-fiber group spread and arrayed in one direction, and
multidirectional fibers, derived from the unidirectional long-fiber group,
the multidirectional fibers cross carbon fibers constituting the unidirectional long-fiber group,
the carbon fiber sheet contains the multidirectional fibers in an amount of 5 to 15% by mass with respect to 100% by mass of the carbon fiber sheet,
the resin of each of the resin-integrated carbon fiber sheets is present on only part of a surface of the carbon fiber sheet and is not impregnated inside the carbon fiber sheet or is only partially impregnated in the carbon fiber sheet, and the resin is resin powder that is melt-solidified and adheres,
and
the fiber reinforced resin molded body is obtained by the molding process of applying heat and pressure on two or more layers of the resin-integrated carbon fiber sheets that are stacked in direct contact with each other to impregnate the resin into the carbon fiber sheets, so that the two or more layers of the resin-integrated carbon fiber sheets are stacked and unified.

2. The fiber reinforced resin molded body according to claim 1, wherein the multidirectional fibers are fibers separated from the unidirectional long-fiber group or bent fibers of the unidirectional long-fiber group.

3. The fiber reinforced resin molded body according to claim 1, wherein the carbon fiber sheet has a tensile strength in a longitudinal direction of 80% or more of a tensile strength of a bundle of the carbon fibers before spreading.

4. The fiber reinforced resin molded body according to claim 1, wherein the fiber reinforced resin molded body comprises the carbon fibers in a volume ratio (Vf) of 30 to 70% based on 100% of the fiber reinforced resin molded body.

5. The fiber reinforced resin molded body according to claim 1, wherein a maximum load of the fiber reinforced resin molded body based on an interlaminar fracture toughness test according to JIS K7086 is higher than a maximum load of a fiber reinforced resin molded body comprising a carbon fiber sheet that has been spread without generating the multidirectional fibers.

6. The fiber reinforced resin molded body according to claim 1, wherein
the resin powder that is melt-solidified adheres to part of the surface of the carbon fiber sheet, and
the resin adhesively fixes the multidirectional fibers to the carbon fiber sheet.

7. A method for producing a fiber reinforced resin molded body, comprising:
forming a resin-integrated carbon fiber sheet by:
spreading a carbon fiber filament group by passage through a plurality of rollers or bars while tensioning the carbon fiber filament group to generate multidirectional fibers from the carbon fiber filament group so that the multidirectional fibers cross carbon fibers constituting a unidirectional long-fiber group of a carbon fiber sheet;
applying resin powder to the carbon fiber sheet, heat-melting the resin powder in a pressure-free state, and cooling it to form a semipreg as a resin-integrated carbon fiber sheet, so that
in the resin-integrated carbon fiber sheet, the heat-melted resin powder is present on only part of a surface of the carbon fiber sheet, and is not impregnated inside the carbon fiber sheet or is only partially impregnated in the carbon fiber sheet; and
applying heat and pressure on two or more layers of the resin-integrated carbon fiber sheets that are stacked in direct contact with each other to impregnate the resin into the carbon fiber sheets, so that the two or more layers of the resin-integrated carbon fiber sheets are stacked and unified,
wherein
the carbon fiber sheet contains the multidirectional fibers in an amount of 5 to 15% by mass with respect to 100% by mass of the carbon fiber sheet.

8. The method according to claim 7, wherein the bars or the rollers vibrate in a width direction of the carbon fiber filament group during spreading of the carbon fiber filament group.

9. The method according to claim 7, wherein a plurality of the carbon fiber filament groups, each being wound on a bobbin, are fed, and opened and spread in the width direction of the carbon fiber filament groups to form a single spread fiber sheet.

10. The method according to claim 7, wherein the tension of the carbon fiber filament group is 2.5 N or more per 15,000 carbon fiber filaments.

* * * * *